United States Patent
Li et al.

(10) Patent No.: US 9,851,980 B1
(45) Date of Patent: Dec. 26, 2017

(54) DISTRIBUTED UPDATE SERVICE ENABLING UPDATE REQUESTS

(71) Applicant: Amazon Technologies, Inc., Reno, NV (US)

(72) Inventors: Gang Li, Bellevue, WA (US); Jiaqi Guo, Seattle, WA (US); Zhe Fu, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 13/657,734

(22) Filed: Oct. 22, 2012

(51) Int. Cl.
*G06F 9/44* (2006.01)
*G06F 9/445* (2006.01)

(52) U.S. Cl.
CPC .............. *G06F 9/44* (2013.01); *G06F 8/65* (2013.01); *G06F 8/67* (2013.01); *G06F 8/71* (2013.01)

(58) Field of Classification Search
CPC ..... G06F 8/65; G06F 8/67; G06F 8/68; G06F 8/71
See application file for complete search history.

(56) References Cited

U.S. PATENT DOCUMENTS

| | | | |
|---|---|---|---|
| 5,909,581 A | 6/1999 | Park | |
| 6,263,499 B1 | 7/2001 | Nakamura et al. | |
| 6,687,901 B1 | 2/2004 | Imamatsu | |
| 7,260,818 B1 * | 8/2007 | Iterum et al. | 717/170 |
| 7,350,202 B2 | 3/2008 | Welfeld | |
| 7,546,495 B2 | 6/2009 | Brondijk | |
| 7,716,660 B2 | 5/2010 | Mackay | |
| 8,090,794 B1 | 1/2012 | Kilat et al. | |
| 8,245,220 B2 | 8/2012 | Imamatsu | |
| 8,260,818 B1 | 9/2012 | Polydov | |
| 8,453,148 B1 * | 5/2013 | Hobbs | 718/102 |
| 8,606,948 B2 * | 12/2013 | Evans | G06F 9/4443 709/230 |
| 8,843,914 B1 | 9/2014 | Klein et al. | |

(Continued)

OTHER PUBLICATIONS

Son et al., "Half-Push Half-Polling", ACM, PLoP'09, Aug. 2009, pp. 1-7; <http://dl.acm.org/citation.cfm?id=1943244&CFID=968133826&CFTOKEN=57638951>.*

(Continued)

*Primary Examiner* — Thuy Dao
*Assistant Examiner* — Ben C Wang
(74) *Attorney, Agent, or Firm* — Knobbe, Martens, Olson & Bear, LLP

(57) ABSTRACT

Systems and methods are disclosed that facilitate the updating of target host computing devices based on versioning information. A set of computing devices are provisioned with a local computing device management component. Each local computing device management component periodically transmits a request to a version control component to determine whether version information associated with the respective computing device corresponds to version filter information. Based on a processing of the version filter information with the current version information of the computing device, the version control component can facilitate the implementation of updates to the requesting computing device. Moreover, clients may be enabled to cause a local computing device management component to transmit a request to the version control component, thereby enabling real-time or near-real-updates to computing devices.

21 Claims, 13 Drawing Sheets

(56) References Cited

U.S. PATENT DOCUMENTS

| | | | |
|---|---|---|---|
| 9,201,644 B2 | 12/2015 | Klein et al. | |
| 9,342,291 B1 | 5/2016 | Guo et al. | |
| 9,672,023 B2* | 6/2017 | Matthew | G06F 8/65 |
| 2004/0054764 A1 | 3/2004 | Aderton et al. | |
| 2004/0073901 A1 | 4/2004 | Imamatsu | |
| 2004/0215755 A1* | 10/2004 | O'Neill | G06F 8/65 |
| | | | 709/223 |
| 2005/0066002 A1 | 3/2005 | Teres et al. | |
| 2006/0106806 A1* | 5/2006 | Sperling | G06F 8/65 |
| 2006/0168578 A1 | 7/2006 | Vorlicek | |
| 2007/0118530 A1* | 5/2007 | Chow et al. | 707/10 |
| 2008/0184216 A1 | 7/2008 | Muedsam | |
| 2008/0244577 A1* | 10/2008 | Le et al. | 718/1 |
| 2009/0138869 A1* | 5/2009 | Fitzgerald et al. | 717/172 |
| 2009/0144717 A1 | 6/2009 | Tamkin et al. | |
| 2009/0150878 A1* | 6/2009 | Pathak et al. | 717/172 |
| 2009/0217244 A1* | 8/2009 | Bozak et al. | 717/124 |
| 2009/0300593 A1* | 12/2009 | Faus et al. | 717/168 |
| 2010/0095293 A1* | 4/2010 | O'Neill | G06F 8/65 |
| | | | 717/173 |
| 2010/0145914 A1* | 6/2010 | Kanno et al. | 707/638 |
| 2010/0161717 A1 | 6/2010 | Albrecht et al. | |
| 2010/0179940 A1* | 7/2010 | Gilder et al. | 707/622 |
| 2010/0218178 A1* | 8/2010 | Sakai | H04N 1/00973 |
| | | | 717/170 |
| 2011/0173603 A1* | 7/2011 | Nakamura | G06F 8/66 |
| | | | 717/173 |
| 2011/0173604 A1* | 7/2011 | Nakamura | G06F 8/63 |
| | | | 717/173 |
| 2011/0209162 A1 | 8/2011 | Machiraju et al. | |
| 2012/0079126 A1* | 3/2012 | Evans | G06F 9/4443 |
| | | | 709/230 |
| 2012/0101998 A1* | 4/2012 | Cahill | G06F 17/30356 |
| | | | 707/654 |
| 2012/0102481 A1* | 4/2012 | Mani et al. | 717/172 |
| 2012/0159469 A1* | 6/2012 | Laor | 717/173 |
| 2012/0174095 A1* | 7/2012 | Natchadalingam et al. | 718/1 |
| 2012/0304163 A1* | 11/2012 | Raman et al. | 717/170 |
| 2012/0311558 A1* | 12/2012 | Yu et al. | 717/171 |
| 2013/0036412 A1* | 2/2013 | Birtwhistle | G06F 19/3412 |
| | | | 717/171 |
| 2014/0006515 A1* | 1/2014 | Yeskel | H04L 12/1895 |
| | | | 709/205 |
| 2014/0149975 A1* | 5/2014 | Doan | G06F 8/65 |
| | | | 717/172 |
| 2014/0196021 A1* | 7/2014 | Cheng | G06F 8/65 |
| | | | 717/173 |
| 2014/0282476 A1* | 9/2014 | Ciudad | G06F 8/65 |
| | | | 717/171 |
| 2014/0282480 A1* | 9/2014 | Matthew | G06F 8/60 |
| | | | 717/172 |
| 2015/0012914 A1 | 1/2015 | Klein et al. | |
| 2015/0205594 A1* | 7/2015 | Pruessmann | G06F 8/65 |
| | | | 717/170 |
| 2017/0068530 A1* | 3/2017 | Berrange | G06F 8/65 |

OTHER PUBLICATIONS

Ma et al., "Introducing Versioning-Based Software Online Upgrade Framework Over a Peer-To-Peer Network", Computing and Informatics, vol. 34, May 2015, pp. 1357-1373; <www.cai.sk/ojs/index.php/cai/article/download/1165/738>.*

Atoofian et al., "Speculative Versioning through Perceptron Predictors", IEEE, Jun. 2012, pp. 1125-1130; <http://ieeexplore.ieee.org/stamp/stamp.jsp?tp=&arnumber=6332300>.*

About Watch Folders, Microsoft Technet, Feb. 27, 2012.

Wang, Z., An Extensible Workflow Modeling Model Based on Ontology, IEEE International Conference on Granular Computing, 2010.

Taylor, D., How Do I Update the Apps on My Apple iPhone?, www.askdavetaylor.com, Sep. 27, 2010.

* cited by examiner

DISTRIBUTED UPDATE SERVICE ENABLING UPDATE REQUESTS

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. With virtualization, the single physical computing device can create, maintain, delete, or otherwise manage virtual machines in a dynamic matter. In turn, users can request computer resources from a data center, including single computing devices or a configuration of networked computing devices, and be provided with varying numbers of virtual machine resources.

In some scenarios, the physical computing devices or instances of a virtual machine may be configured according to a number of virtual machine instance types to provide specific functionality, often referred to as provisioning. For example, various computing devices may be associated with different combinations of operating systems or operating system configurations, hardware resources (actual or virtualized) and software applications to enable a computing device to provide different desired functionalities, or to provide similar functionalities more efficiently. These customized configurations are often provided within a device image, which a computing device may process in order to implement the desired software configuration and which can be standardized among a set of host computing devices.

Once the initial provisioning has occurred or while an initial provisioning is occurring, however, at least a portion of the machine image (e.g., the operating environment, software applications, or configurations) may need to be updated. It can be difficult for a service provider to identify all possible host computing devices that may require updating or to implement update information for a large set of host computing devices.

BRIEF DESCRIPTION OF THE DRAWINGS

The foregoing aspects and many of the attendant advantages will become more readily appreciated by reference to the following detailed description, when taken in conjunction with the accompanying drawings, wherein.

DETAILED DESCRIPTION

Figure 1:
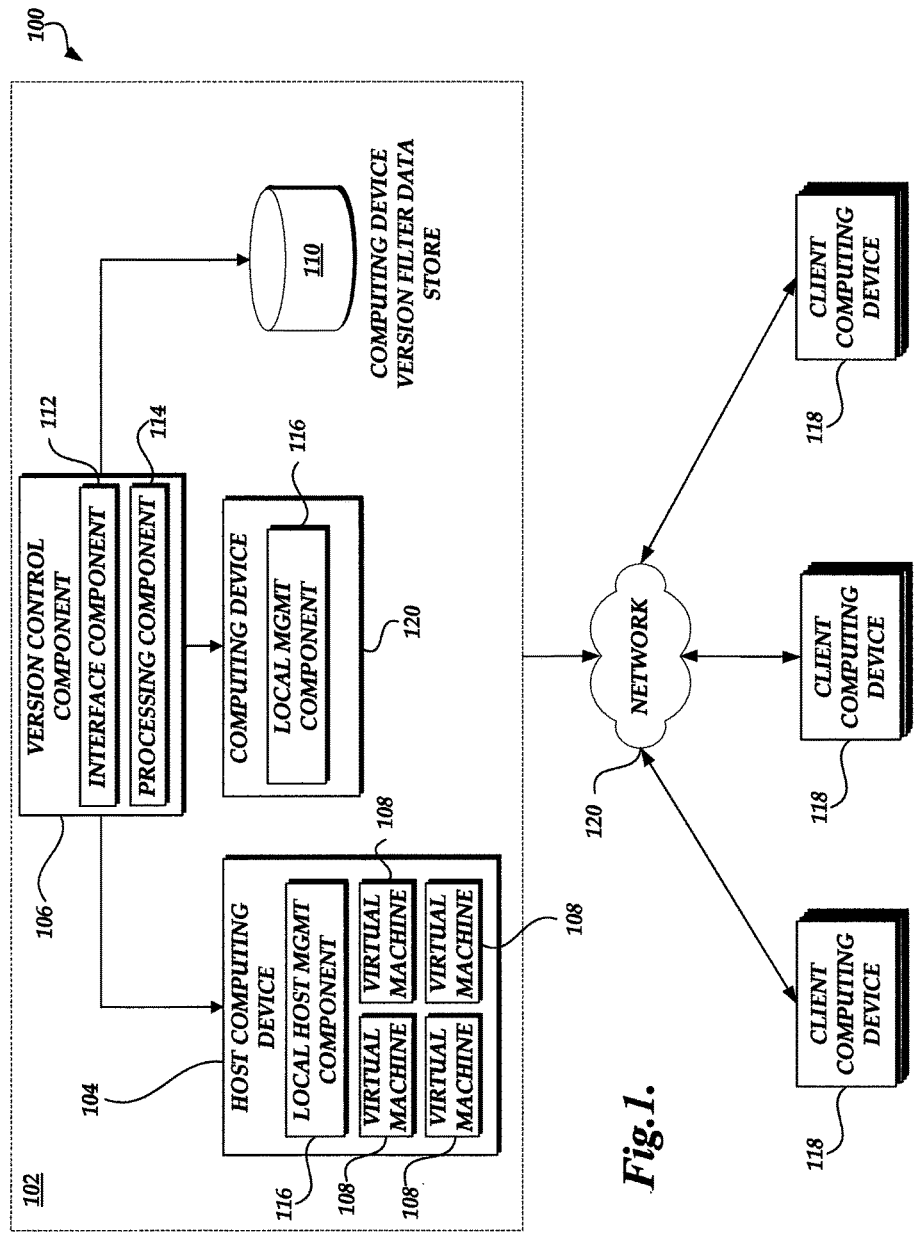
FIG. 1 is a block diagram depicting an illustrative virtual network environment including a number of computing devices and a version control component.

Generally described, aspects of the present disclosure relate to the management of computing devices. Specifically, systems and methods are disclosed that facilitate the updating of target computing devices, such as host computing devices or networking computing devices, based on versioning information. A version control component is provided to facilitate transmission of update information to a set of target computing devices. Each of the set of target computing devices may be provisioned with a local management component configured to facilitate reaching the desired goal state by communication with the version control component.

Illustratively, the version control component may maintain, for each of the set of target computing devices, goal state information representing a desired state of the computing device (e.g., a set of desired configurations, updates, versions, modifications, etc.). Periodically, each local management component can transmit a request to the version control component to determine whether version information associated with the respective computing device corresponds to the desired goal state for the computing device. The desired goal state of each computing device can be expressed in the form of version filter information. Based on a processing of the version filter information with the current version information of the computing device, the version control component can facilitate the implementation of updates to the requesting host computing device in order to reach the desired goal state of the computing device. Moreover, in some embodiments, a local host management component operating on a computing device may be configured to receive an update request from a client computing device, and, in response, to implement any necessary updates.

By provisioning a local host management component on each computing device, the processing and memory requirements associated with implementation of updates and version information may be distributed across those computing devices, rather than being placed on a the version control component, as it may be if the version control component was configured to "push" or transmit updates to each computing devices independent of requests from the computing device. Specifically, because each local host management component may create and transmit a request for version information independent of the version control component, the version control component may not be required to maintain a list of computing devices to be updated. Moreover, because each local host management component may create and transmit a request for version information independent of version control component, the version control component may not be required to initiate communication with each computing device in order to implement an update. Such distribution of responsibility for creation of update requests may be especially beneficially in enterprise environments or environments with a large number of computing devices. Moreover, because each computing device is configured to request update information independent of a request from the version control component, the version control component may not be required to maintain status information of each computing device. This may be beneficial, for example, in environments where computing devices change status or availability rapidly (e.g., based on connectivity or hardware issues, reconfiguration, power failure, maintenance, etc.).

Still further, enabling each computing device to request update information may enable load balancing with respect to transmission of updates. For example, sets of computing devices may be configured to transmit requests for update information at staggered intervals. Accordingly, the version control component may be required to service only a portion of all computing devices at any given point in time. In addition, staggered update intervals may reduce the bandwidth, memory, or processing requirements of other devices related to implementation of updates, such as data stores storing update information (e.g., patch files, configuration files, etc.), routers or networking devices serving computing devise to be updated, etc. As will be described in more detail below, in some embodiments, a local host management component of each computing device may be configured to request version information from a version control component according to a set of query criteria. Such query criteria may be selected, for example, in order to balance a desire that all computing devices are kept up to date (e.g., are in a state corresponding to their goal state) with a desire to minimize the processing power required to implement updates across a number of computing devices.

However, in one example, the update frequency facilitated by the query criteria of each local host management component (e.g., in order to distribute updates over a period of time) may be insufficient to meet the requirements of a specific client or user. Illustratively, a client may wish to test a specific update package, modification, or configuration on a target computing device. Accordingly, the client may request that the goal state associated with the target computing device be altered to reflect the client's desired modification. However, as described above, the target computing device may be configured to interact with the version control component only periodically, which may result in a delay in the target computing device reaching the desired goal state. In the instance in which a client desires an immediate or substantially immediate update, such a delay in reaching a target goal state may be unsatisfactory to the client, especially where the delay is large (e.g., hours, days, etc.). As such, in accordance with aspects of the present disclosure, the version control component may be configured to receive an update trigger request from the client requesting that the target computing device be updated immediately or substantially immediate (e.g., without waiting until the next periodic update as specified by the query criteria). In response to the client's update trigger request, the version control component may transmit an update trigger command to the target computing device that causes the target computing device to request update information in real-time or near real-time. On reception of the update trigger command, the target computing device may transmit a request for update information from the version control component in order to implement any necessary updates. By use of such an update trigger command, the client may be enabled to update or modify target computing devices in real time or near real time.

By utilization of a distributed update system, as described above, that further enables transmission of update trigger commands to target computing devices, the resources needed to generally implement the majority of updates may be reduced, while still meeting the needs of clients who require rapid implementation of specific updates. For example, in the majority of instances, computing devices may periodically submit requests for version information, therefore maintaining a relatively steady load on the version control component. However, in instances where immediate or near-immediate updates or modifications are necessary to a computing device, such updates or modifications may be facilitated.

Further, for devices configured to interact with a version control component, implementation of update trigger commands may be facilitated with low or minimal modification. Specifically, computing devices may only require modification to enable the computing device to receive a trigger command to execute an already-implemented update process. In contrast, traditional "push" methods may require extensive reconfiguration of a computing device in order to implement pushed commands. For example, traditional "push" methods may require that a computing device be reconfigured to maintain an open connection for receiving commands, and to be reconfigured to execute any received command. In addition, modifications needed for traditional "push" commands, such as enabling an external client or user to directly execute commands on a computing device, may result in undesired security compromises. However, by utilizing update triggers that implement already-existing update functionality, security implications may be minimized.

As will be described in more detail below, in some embodiments, goal states for a computing device may be independent of an identity of the computing device. For example, goal states may be based on a configuration of a computing device. Illustratively, a set of computing devices may include a first sub-set of devices with a first configuration (e.g., operating system, processing power, persistent or transient memory, network or internal bandwidth access, power supply, efficiency, etc.) and a second sub-set of devices with a second configuration. A version control component may maintain goal state information corresponding to each of the two configurations. The version control component may associate each computing device of the first sub-set with a first goal state, while associating each computing device of the second sub-set with a second goal state. Because computing devices may be associated with goal states based on their configuration, the version control component may not be required to maintain goal states for each individual computing device. Further, maintaining goal states independent of identities of computing devices may facilitate interaction of additional computing devices with the version control component without reconfiguration of the version control component. Illustratively, additional computing devices of the first configuration may automatically be associated with a first goal state based on that configuration, without requiring modification of the version control component.

While specific embodiments and example applications of the present disclosure will now be described with reference to the drawings, these embodiments and example applications are intended to illustrate, and not limit, the present disclosure. Specifically, while various embodiments and aspects of the present disclosure will be described with regard to host computing devices hosting virtual machine instances running applications, one or more aspects of the present disclosure can be applied with physical computing devices or combinations of physical computing devices and instantiated virtual machine instances. Accordingly, reference to the term "host computing device" does not imply the configuration of any specific functionality for a computing device or the requirement that the computing device host one or more virtual machine instances. Still further, one or more aspects of the present disclosure may be applicable to a variety of computing devices, including, but not limited to, networking computing devices.

FIG. 1 is a block diagram illustrating an embodiment of a virtual network environment 100. The virtual network environment 100 includes a virtual network 102 that includes multiple physical computing devices, generally referred to herein as host computing devices 104. Each host computing device 104 is capable of hosting multiple virtual machine instances 108. At least some of the virtual machine instances 108 may be provisioned to provide a variety of different desired functionalities depending on the needs of the data center. Examples of the types of desired functionality, include but are not limited to: database management, serving or distributing data or content (e.g., Web servers), managing load balancing or network resources, managing network connectivity or security, providing network addressing information, managing client or server redirection, or any other functionality associated with a data center. One skilled in the relevant art will appreciate that the virtual network 102 is logical in nature and can encompass physical computing devices 104 from various geographic regions. As will be described in greater detail below, each host computing device 104 includes a local computing device management component 116 for transmitting version filter checks to a version control component and processing the results of the check. In a further embodiment, the virtual network 102 can include one or more computing devices 120 that correspond to any one of a variety of computing devices, including, but not limited to network computing devices (e.g., routers, switches, etc.), communication computing devices, and the like: For example, one of the computing devices 120 can correspond to a router or switch or a computing device configured to emulate the functionality of the router or switch in the virtual network 102.

The virtual network 102 also includes a version control component 106 for processing requests for the determination of updates to host computing devices 104. Additionally, the version control component 106 can provide updates to one or more of host computing devices 104. Although illustrated as a single, stand-alone component, the version control component 106 can be implemented in a distributed manner. Additionally, one or more aspects of the version control component 106 may be implemented in other computing devices, such as a virtual machine instance.

With continued reference to FIG. 1, the virtual network 102 can further include a computing device version filter data store 110 for maintaining, at least in part, version filter information that corresponds to a defined goal state for version information for host computing devices 104 or computing devices 120. Additionally, the computing device version filter data store 110 can include information, such as executable code, configuration settings/information, and other information, utilized to identify or implement updates for the host computing devices 104 or computing devices 120. The computing device version filter data store 110 may correspond to network attached storage (NAS), database servers, local storage, or other storage configurations which may be implemented in a centralized or distributed manner. Additionally, although a single host computing device version filter data store 110 is illustrated, one skilled in the relevant art will appreciate that any number of data stores may be utilized to implement the computing device version filter data store 110.

Connected to the virtual network 102 via a network 120 are multiple client computing devices 118. The network 120 may be, for instance, a wide area network (WAN), a local area network (LAN), or a global communications network. In some instances, the client computing devices 118 may interact with the virtual network 102 to request or define version filter information or to define a distribution of version filter information for a set of host computing devices 104.

Figure 2A:
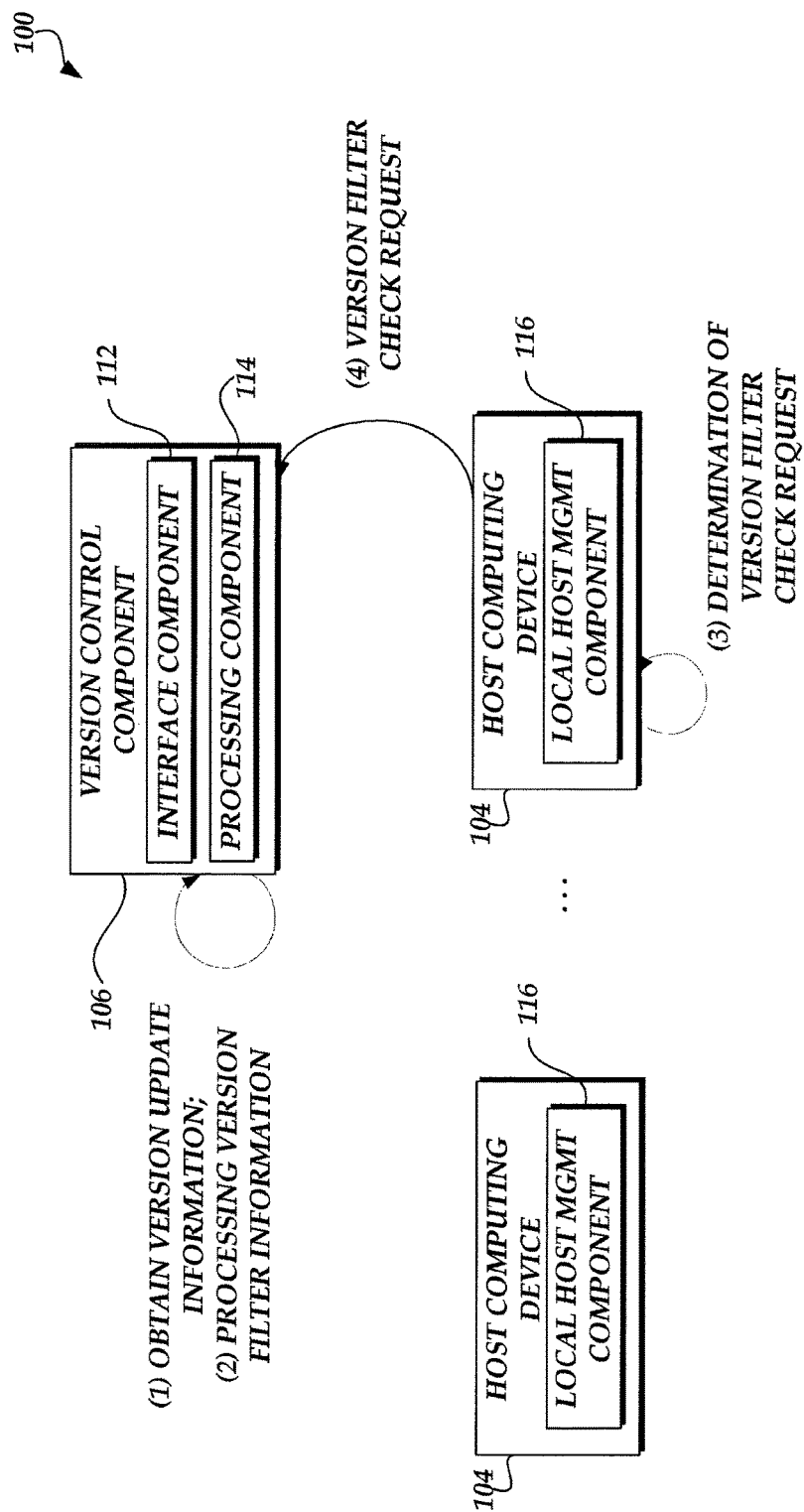
FIGS. 2A-2C are simplified block diagrams of the virtual network of FIG. 1 illustrating the updating of host computing devices based on version filter information.
Figure 2B:
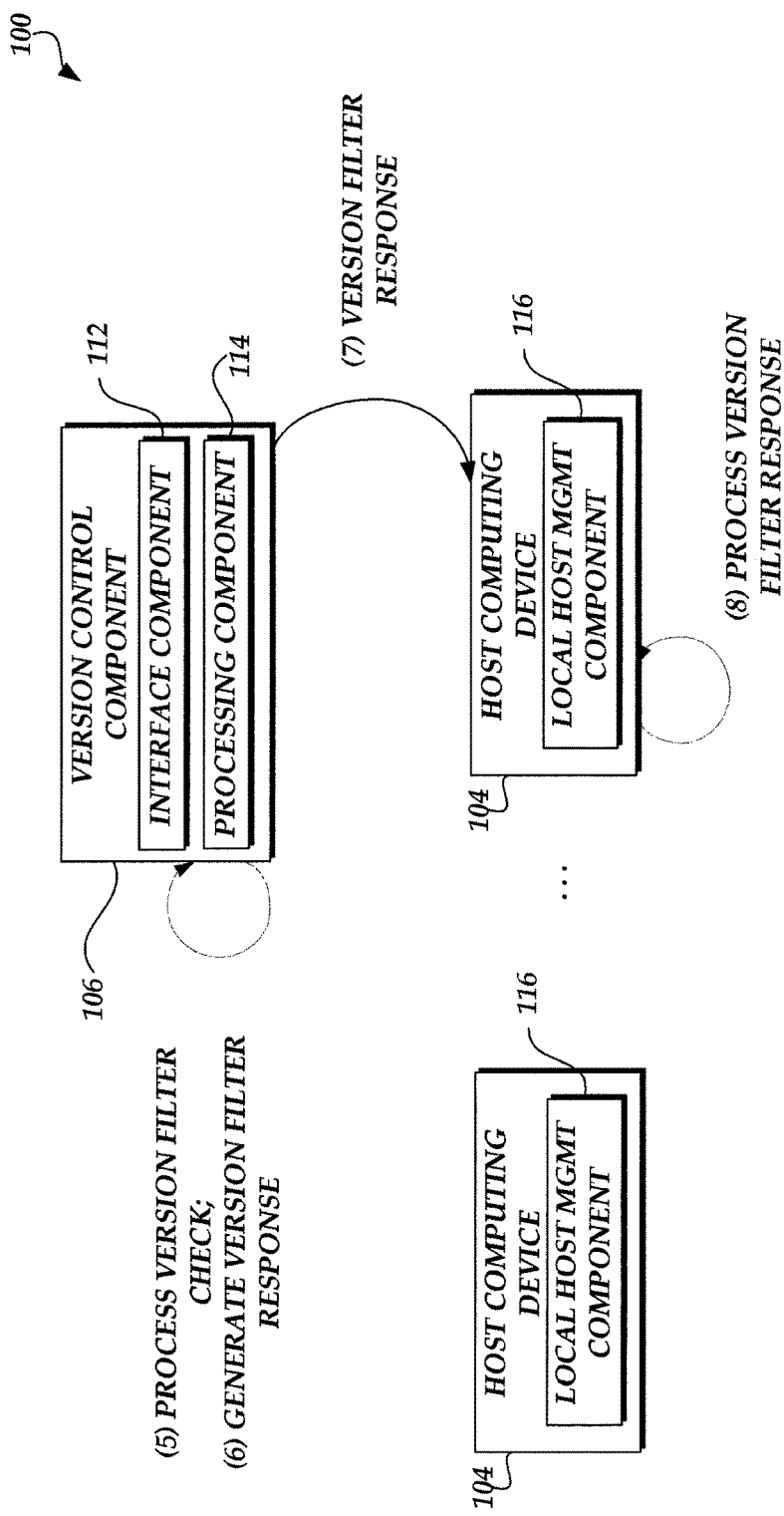
Figure 2C:
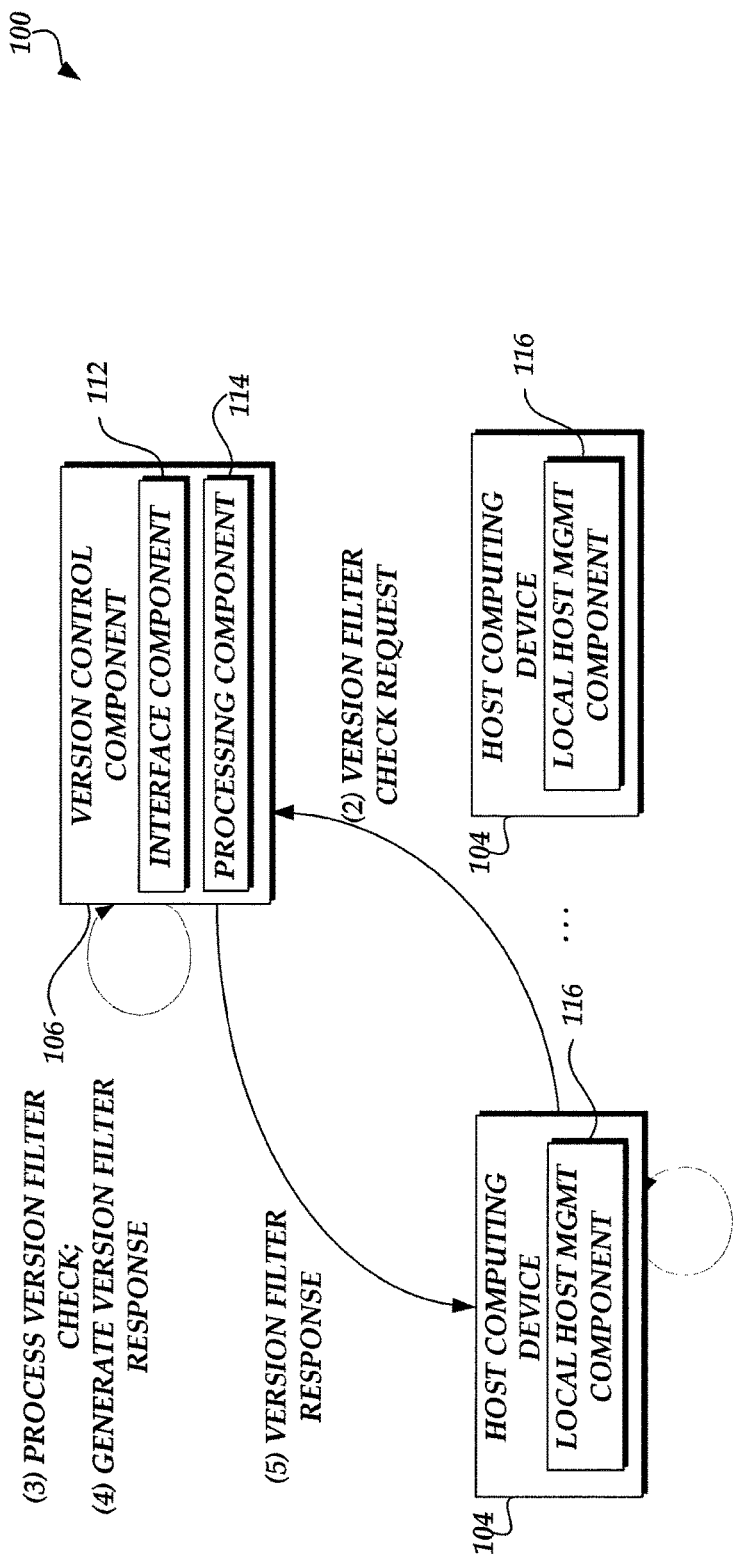

With reference now to FIGS. 2A-2C, illustrative interactions between the components of the virtual network 102 for the updating of host computing devices 104 based on versioning information and version filter information will be described. Although FIGS. 2A-2C will be described with regard to host computing devices 104, one skilled in the relevant art will appreciate that similar interaction may be implemented on computing devices 120 or combinations of host computing devices 104 and computing devices 120. Accordingly, the interactions illustrated in FIGS. 2A-2C should not be construed as limiting.

With reference first to FIG. 2A, the version control component 106 obtains version update information corresponding to a desired version goal state for a set of host computing devices 104 (1). Illustratively, the specification of the desired goal state may be transmitted by a client computing device 118, such as a client computing device associated with a system administrator, in accordance with an Application Protocol Interface ("API"). Alternatively, the version control component 106 may make the determination of the desired goal state based on processing information made available by a network based service, processing error reports, or making comparisons of software application or operating system environments of other host computing devices 104.

Illustratively, the version control component 106 processes version filter information for each host computing device 104 that is in the virtual network 102 or in a set of host computing devices (2). For example, the version control component 106 may process version filter information for each host computing device 104 in a data center. In one embodiment, the version control component 106 may not necessarily be able to identify each host computing device 104 that is currently operational in the set of host computing devices (e.g., within a data center). For example, one or more host computing devices 104 may be periodically removed or added to the data center without specific tracking information provided to the version control component 106. Accordingly, the version filter information may be defined for host computing devices 104 based on specific identification information for an individual host computing device or based on general characteristics of a host computing device (e.g., any host computing device that is provisioned with a type of software application).

Still further, the modification of the version filter information for a set of host computing devices 104 may be based on a time distribution of updates for the set of host computing devices. In one example, the version control component 106 may modify version filter for a small subset of the set of host computing devices as a test group. In another example, the version control component 106 may implement a random or pseudo-random modification of version filter information. In still a further example, the version control component 106 may apply additional criteria regarding aspects of the host computing devices, such as geographic location, shared computing resources, performance, priority information and the like.

With continued reference to FIG. 2A, at some point, a local computing device management component 116 on a host computing device 104 makes a determination to transmit a version filter check to the version control component 106 (3). In one embodiment, the determination whether to transmit the version filter check may be based on time criteria, such as minimum and maximum times for transmitting version filter check requests. In another embodiment, the determination of whether to transmit the version filter check may be based on other criteria, such as a communication network availability, error conditions, performance thresholds (maximum and minimum), and the like. Additionally, the local computing device management component 116 can also implement time based criteria for distributing the timing of the requests to the version control component 106. Based on the determination, the local computing device management component 116 transmits the version filter check to the version control component 106 (4).

With reference now to FIG. 2B, the version control component 106 obtains the filter request and processes a version filter request (5). Illustratively, the version control component 106 obtains version information that is included in the version filter check transmitted by the local computing device management component 116. Alternatively, the version control component 106 can transmit requests to the local computing device management component 116 for specific information or additional information as necessary. Illustratively, the version control component 106 makes a comparison of the current version information associated with the requesting host computing device 104 to determine whether the host computing device is associated with desired version goal state, as defined in the version filter information.

Based on the comparison, the version control component 106 can then generate a version filter response (6). In one embodiment, the version control component 106 can generate a notification that an update is required. Additionally, the version control component 106 can provide update information utilized by the requesting host computing device 104 to cause an update to software code. In another embodiment, the version control component 106 can transmit a notification that no update is necessary. Alternatively, the version control component 106 may not transmit any notification if the version filter check passes. Still further, the version control component 106 can generate information that will be used by the local computing device management component 116 to transmit the next version filter check requests. The resulting information is transmitted to the requesting host computing device 104 (7) and processed (8).

Turning now to FIG. 2C, as previously described, each local computing device management component 116 on the host computing device 104 can make a determination of whether to transmit a version filter check (1). In one embodiment, the determination whether to transmit the version filter check may be based on time criteria, such as minimum and maximum times for transmitting version filter check requests. In another embodiment, the determination of whether to transmit the version filter check may be based on other criteria, such as a communication network availability, error conditions, performance thresholds (maximum and minimum), and the like. Additionally, the local computing device management component 116 can also implement time based criteria for distributing the timing of the requests to the version control component 106. Based on the determination, the local computing device management component 116 transmits the version filter check to the version control component 106 (2).

The version control component 106 obtains the filter request and processes a version filter request (3). Illustratively, the version control component 106 obtains version information that is included in the version filter check transmitted by the local computing device management component 116. Alternatively, the version control component 106 can transmit requests to the local computing device management component 116 for specific information or additional information as necessary. Illustratively, the version control component 106 makes a comparison of the current version information associated with the requesting host computing device 104 to determine whether the host computing device is associated with desired version goal state, as defined in the version filter information.

Based on the comparison, the version control component 106 can then generate a version filter response (4). In one embodiment, the version control component 106 can generate a notification that an update is required. Additionally, the version control component 106 can provide update information utilized by the requesting host computing device 104 to cause an update to executable code, modify configuration information. In another embodiment, the version control component 106 can transmit a notification that no update is necessary. Alternatively, the version control component 106 may not transmit any notification if the version filter check passes. Still further, the version control component 106 can generate information that will be used by the local computing device management component 116 to transmit the next version filter check requests. The resulting information is transmitted to the requesting host computing device 104 (5) and processed (6).

Figure 3:
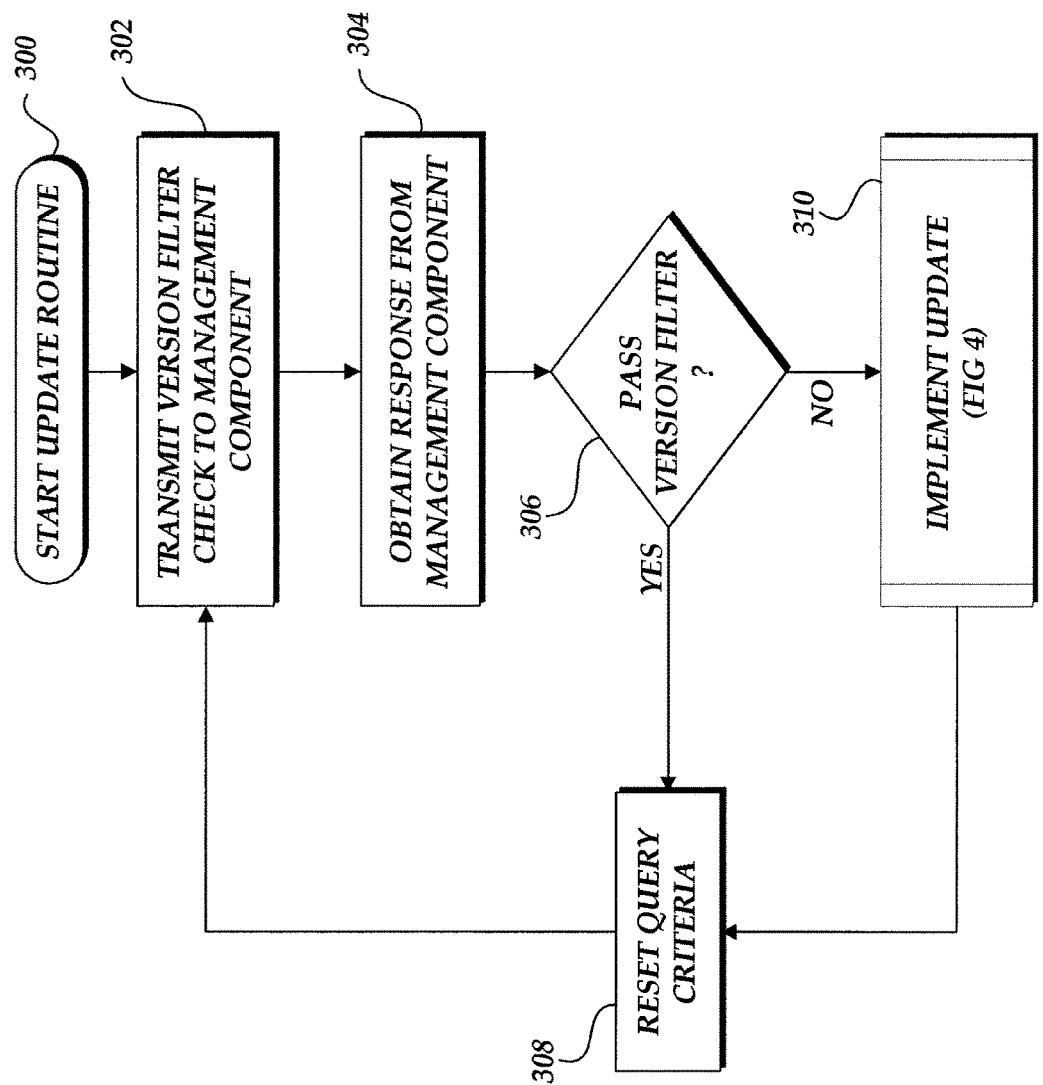
FIG. 3 is a flow diagram illustrating an update routine implemented by a computing device.

Turning now to FIG. 3, a routine 300 for generating an update request, such as a version filter request, implemented by a local computing device management component 116 on a host computing device 104 will be described. Although routine 300 will be described with regard to the local computing device management component 116, one skilled in the relevant art will appreciate that one or more portions of routine 300 may be implemented by other components of the host computing device 104. At block 302, the host computing device 104 transmit a version filter check request to the version control component 106. As previously described, in one embodiment, the determination whether to transmit the version filter check may be based on time criteria, such as minimum and maximum times for transmitting version filter check requests. In another embodiment, the determination of whether to transmit the version filter check may be based on other criteria, such as a communication network availability, error conditions, performance thresholds (maximum and minimum), and the like. Additionally, the local computing device management component 116 can also implement time based criteria for distributing the timing of the requests to the version control component 106.

At block 304, the host computing device 104 obtains a response from the host computing device 104. In an illustrative embodiment, the host computing device 104 can obtain information that identifies whether the version filter check resulted in a determination of whether the host computing device satisfies the desired version goal state. Additionally, the resulting information can also include information identifying any updates that should be implemented by the host computing device 104 or the update information itself.

At decision block 306 a test is conducted to determine whether the version filter check indicates that the host computing device satisfies the version filter check (e.g., passes the version filter check). If the host computing device 104 passes the version filter check, at block 308, the local computing device management component 116 resets the query criteria. In one embodiment, the local computing device management component 116 can reset the query criteria by restarting a timer or clearing any criteria utilized to determine whether to transmit the request at block 302. Additionally, the local computing device management component 116 can process any information provided by the version control component 106 with regard to controlling the query criteria utilized by the local computing device management component 116.

If at decision block 306, the host computing device 104 does not pass the version filter check information, at block 310, the local computing device management component 116 implements updates based on information provided by the version control component 106. An illustrative subroutine for implementing updates based on type information for host computing devices 104 will be described below with regard to FIG. 4. However, one skilled in the relevant art will appreciate that the implementation of updates on host computing devices 104 or on computing devices 120 may incorporate additional or alternative criteria. The routine 300 then returns to block 308 in which the local computing device management component 116 resets the query criteria.

Figure 4A:
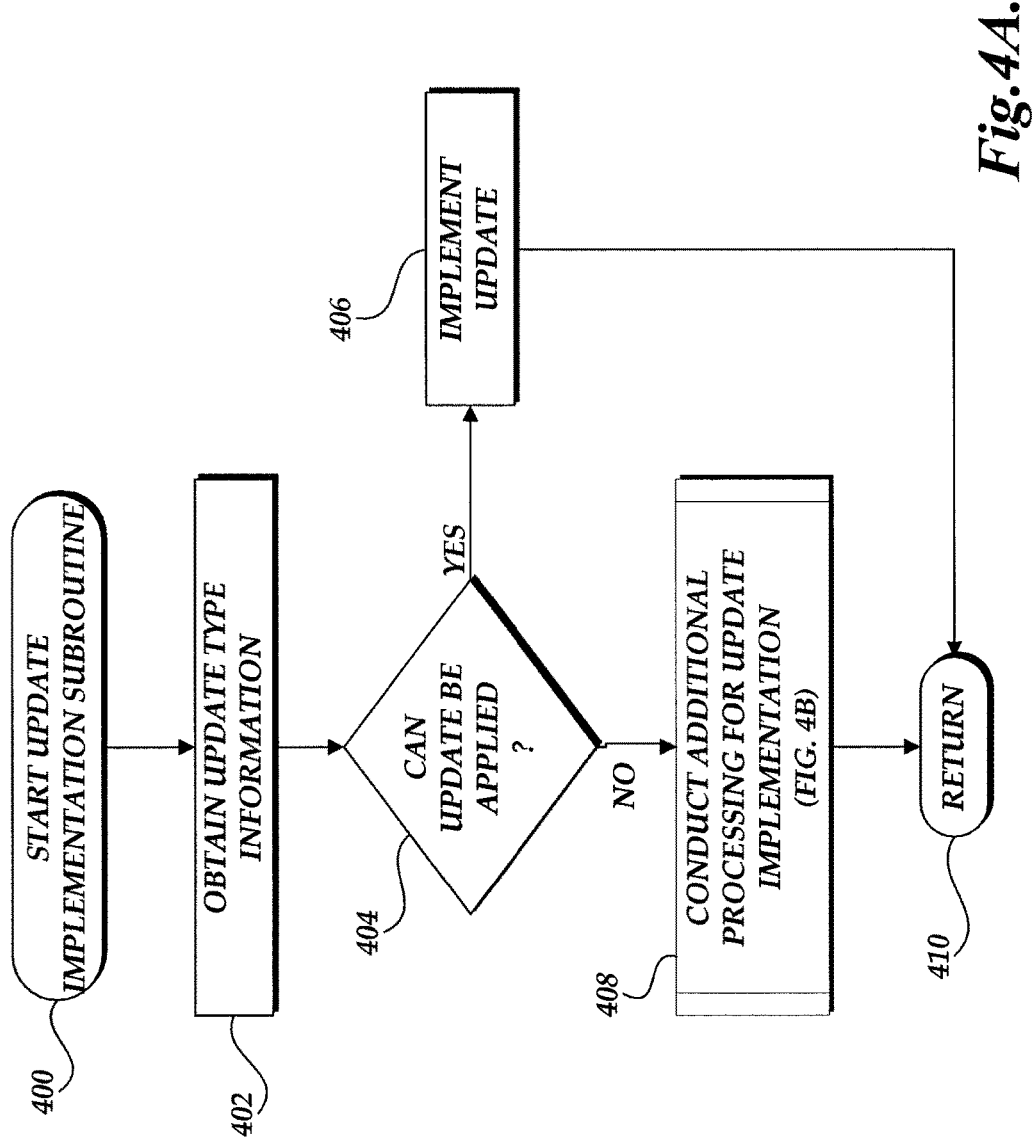
FIG. 4A is a flow diagram illustrating an update implementation subroutine implemented by a computing device.

Turning now to FIG. 4A, a subroutine 400 for update implementation based on type information on a host computing device 104 will be described. Illustratively, the local computing device management component 116 can implement subroutine 400 as part of the execution of block 310 (FIG. 3). At block 402, the local computing device management component 116 obtains update type information for the update to be implementation. In one embodiment, the update type information can specify that the update can be implemented on the host computing device without having to terminate any virtual machine instances or without requiring a reboot. In this embodiment, the local computing device management component 116 may still need to do some additional processing. In another embodiment, the update type information can specify that any existing virtual machine instances may need to be terminated to implement the update, but that the host computing device 104 does not need to be rebooted. In still a further embodiment, the update type information can specify, that all existing virtual machine instances need to be terminated and that the host computing device 104 requires a reboot.

At decision block 404, a test is conducted to determine whether the update can be applied (e.g., without termination of any existing virtual machine instances and without requiring a reboot). Illustratively, the local computing device management component 116 can utilize policy information that governs the implementation of updates on the host computing devices 104. For example, policy information for host computing devices 104 hosting virtual machine instances can specify whether or not currently instantiated virtual machine instances needs to be terminated prior to implementing updates. In another example, policy information for host computing devices 104 can specify other requirements for the host computing devices that will be utilized to determine whether to implement the update. If the updated can be applied, at block 406, the local computing device management component 116 implements the update and the subroutine 400 returns at block 410.

With reference again to decision block 404, if the update cannot be applied to the host computing device 104 (or other computing device 120), at block 408, the host computing device 104 (or computing device 120) conducts additional processing for update implementation. An illustrative subroutine 450 for conducting additional processing to implement an update will be described with regard to FIG. 4B. At block 410, the subroutine 400 returns.

Illustratively, upon return of the subroutine 400 at block 410, the host computing device 104 (or computing device 120) can reset query criteria and check for additional updates. Accordingly, the host computing device 104 can continuously check and attempt to implement updates. Additionally, in embodiments in which the host computing device 104 (or computing device 120) is in the process of implementing updates that may require the suspension of resources or a reboot, the host computing device 104 can continue to identify and possibly implement additional updates.

Figure 4B:
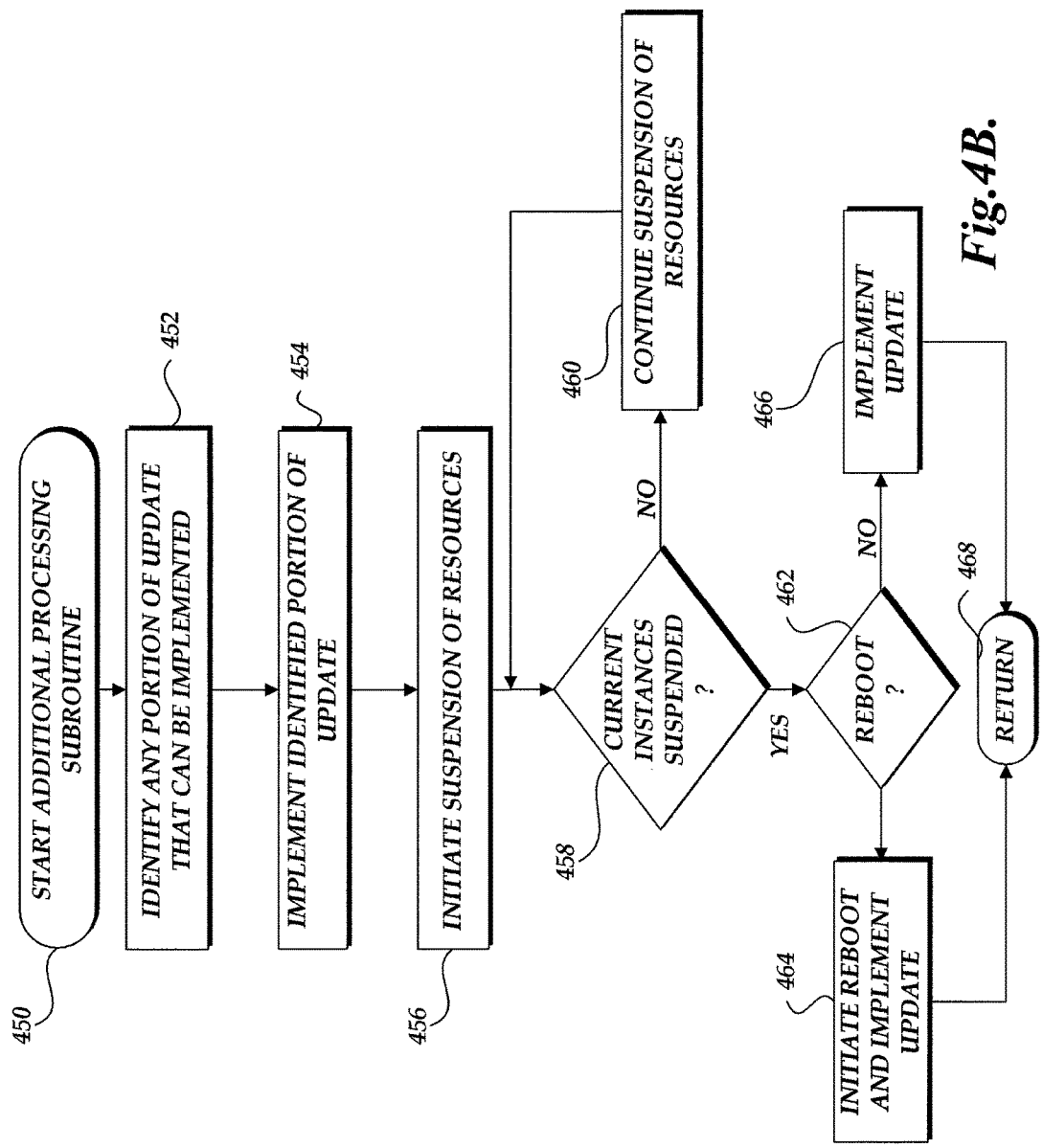
FIG. 4B is a flow diagram illustrating an additional processing subroutine implemented by computing device.

Turning now to FIG. 4B, a subroutine 450 for conducting additional processing in order to implement a pending update will be described. Illustratively, the local computing device management component 116 can implement subroutine 400 as part of the execution of block 408 (FIG. 4A). At block 452, the local computing device management component 116 identifies any portion of the pending update that can be implemented. In an illustrative example, at least some portion of an update may implemented even if other portions of the update are dependent on criteria not yet satisfied, such as completion of a previous update or execution of a process. Accordingly, at block 454, the local computing device management component 116 attempts to implement any identified portions of the update information that are not dependent on criteria (e.g., partial updates).

Once the implementation of the identified partial updates or portions of the updates has been initiated, at block 456, the local computing device management component 116 can initiate the suspension one or more resources that are associated with the specific host computing device 102. In one embodiment, the local computing device management component 116 can determine whether to suspend the execution of virtual machine instances currently being executed by the host computing device 104. In another embodiment, the host computing device 104 (or other computing device 120) can determine whether to cause the termination or suspension of virtual machine instances on other host computing devices 104. For example, a computing device in communication with one or more host computing devices 104 may cause the termination of virtual machine instances on the host computing devices prior to implementing an update.

At decision block 458, a test is conducted to determine whether the identified virtual machine instances that need to be suspended or terminated have been suspended or terminated. If not, the subroutine 400 may enter into a waiting period or attempt additional activities to cause the suspension of resources at block 458. Additionally, the local computing device management component 116 may also check to see whether the request to suspend resources should be terminated. For example, the local computing device management component 116 may determine that the request to suspend (or terminate) resources has taken too long, which may be indicative of a failed attempt or likelihood of failure.

With reference again to decision block 458, once any identified virtual machine instances have been suspended (or otherwise terminated), at decision block 462, a test is conducted to determine whether the host computing device requires a reboot. If the host computing device 104 does not require a reboot, the subroutine 450 proceeds to block 466 in which the local computing device management component 116 implements the update and the subroutine 450 returns at block 468. Alternatively, if a reboot is required, at block 464, the local computing device management component 116 initiates a reboot and implements the update. The subroutine 450 returns at block 468. As previously described, in one embodiment, the implementation of the partial updates and suspension of resources can occur in parallel with determination of additional or subsequent update information and the attempted implementation of the additional or subsequent update information.

Figure 5:
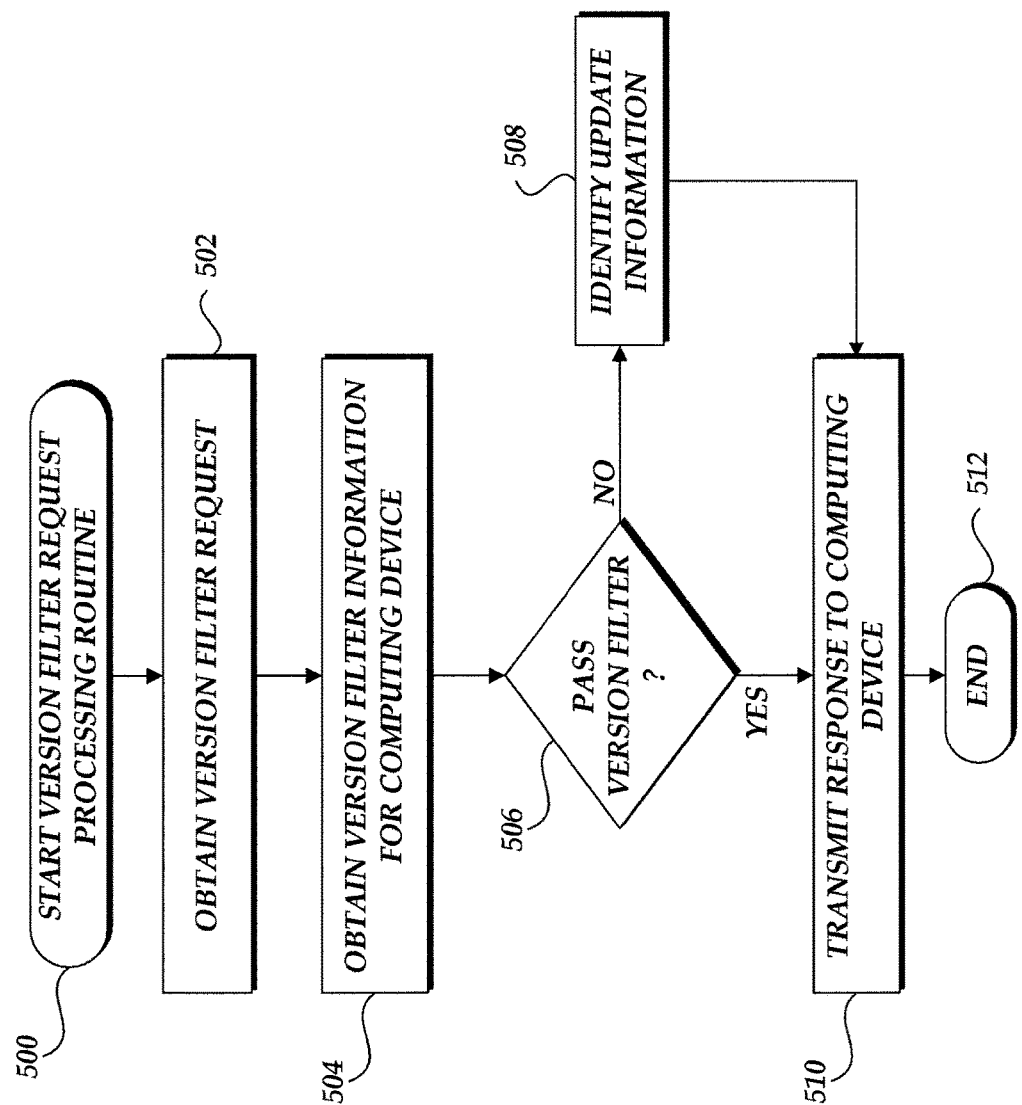
FIG. 5 is a flow diagram illustrating a version filter request processing routine implemented by a version control component.

Turning now to FIG. 5, a routine 500 for processing version filter check requests implemented by a version control component 106 will be described. At block 502, the version control component 106 obtains a version filter request. In one example, the version filter request is transmitted by the local computing device management component 116. As previously described, the local computing device management component 116 can independently transmit the version filter request in accordance with criteria evaluated by the local computing device management component 116 or other information provided by the version control component 106. The version filter request can be an API and can include a variety of information that will be utilized by the version control component 106 in processing the request. For example, the version filter request can include information identifying operating system and software applications that are executing on the requesting host computing device 104. In another example, the version filter request can include information identifying the last version, or equivalent version, of the operating system and software applications executing on the host computing device 104. In still further examples, the version filter request can include information that is different from previous information provided by the local computing device management component 116.

At block 504, the version control component 106 obtains version filter information that specifies the desired version goal state for the identified computing device, such as host computing device 104. The version control component 106 can obtain the version filter information from the computing device version filter data store 110 or from local memory (e.g., cache memory). At decision block 506, a test is conducted to determine whether version filter information corresponds to the version information identified in the version request (directly or indirectly).

If the version filter information does not match with the version information, it can be assumed that the computing device, such as host computing device 104, may have one or more updates to implement. Accordingly, at block 508, the version control component 106 identifies update information. In one embodiment, the version control component 106 can generate a notification that an update is required and identify one or more potential sources of the update. In another embodiment, the version control component 106 can generate the notification and provide the update information required (e.g., code to modify the operating system or software application code). If the version filter information matches the version information (e.g., no update is required) or once the notifications and updates are generated at block 508, at block 510, the version control component 106 transmit a response to the requesting local computing device management component 116. As previously discussed, however, in one embodiment, if no update is required, the version control component 106 can omit the transmission of any information to the local computing device management component 116. At block 512, the routine 500 terminates.

Figure 6:
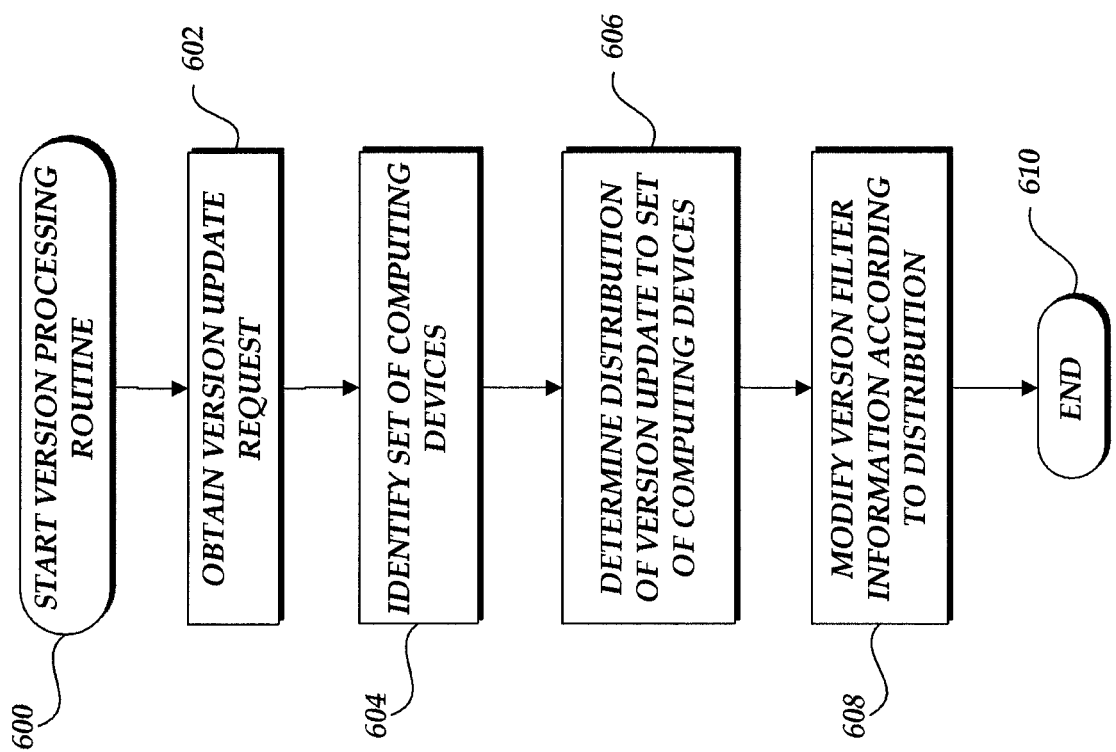
FIG. 6 is a flow diagram illustrating a version processing routine implemented by a host version control component.

Turning now to FIG. 6, a routine 600 for creating or managing version filter information will be described. Illustratively, routine 600 can be implemented by a version control component 106. However, routine 600 can be implemented, in whole or in part, by other components of the virtual network environment 100. At block 602, the version control component 106 obtains a request or notification corresponding to a version update. Illustratively, the request can correspond to an API (such as from a client computing device 118) call that specifies a most current version for a host computing device 104 or set of host computing devices 114. The request can identify specific host computing devices or provide criteria that allow the version control component 106 to determine how the version update request will apply to each host computing device 104 in the set of host computing devices.

At block 604, the version control component 106 identifies that set of computing devices, such as a set of host computing devices 104, that correspond to the version update request. In one example, if the version update request specifically identifies individual host computing devices 104, the version control component 106 can utilize the identification information included in the request. In another example, if the version update request includes criteria for selecting the set of host computing devices, the version control component 106 can process the criteria. Still further, in some situations, the version control component 106 may not necessarily be aware of the current status or presence of all the host computing devices in the set of host computing devices (e.g., a datacenter). In this scenario, the processing of the version filter information may not be done prior to receiving a request from a previously unknown or forgotten host computing device 104.

At block 606, the version control component 106 determines a distribution of the version filter information for the set of computing devices. In one embodiment related to host computing devices 104, if individual host computing devices are identified in the version update information, the determination of the distribution can correspond to the selected or identified host computing devices. In another embodiment, the distribution to a set of host computing devices may correspond to random or pseudo random selection of host computing devices from a set of host computing devices. Accordingly, the selected distribution can correspond to an evaluation of the random or pseudo-random processes. In a further embodiment, the distribution to a set of host computing devices can correspond to weighted distribution of host computing devices. For example, the weighting of the set of host computing devices may be utilized to select a test group to implement an update. A second set of weights can then be selected to stagger the implementation to a larger group and can then be repeated several times. In other embodiments, the version control component 106 may also implement additional time delays or distribution techniques beyond any distribution information provided in the update request.

At block 608, the version control component 106 implements the distribution by modifying version filter in accordance with the determined distribution. At block 610, the routine 600 terminates.

Figure 7A:
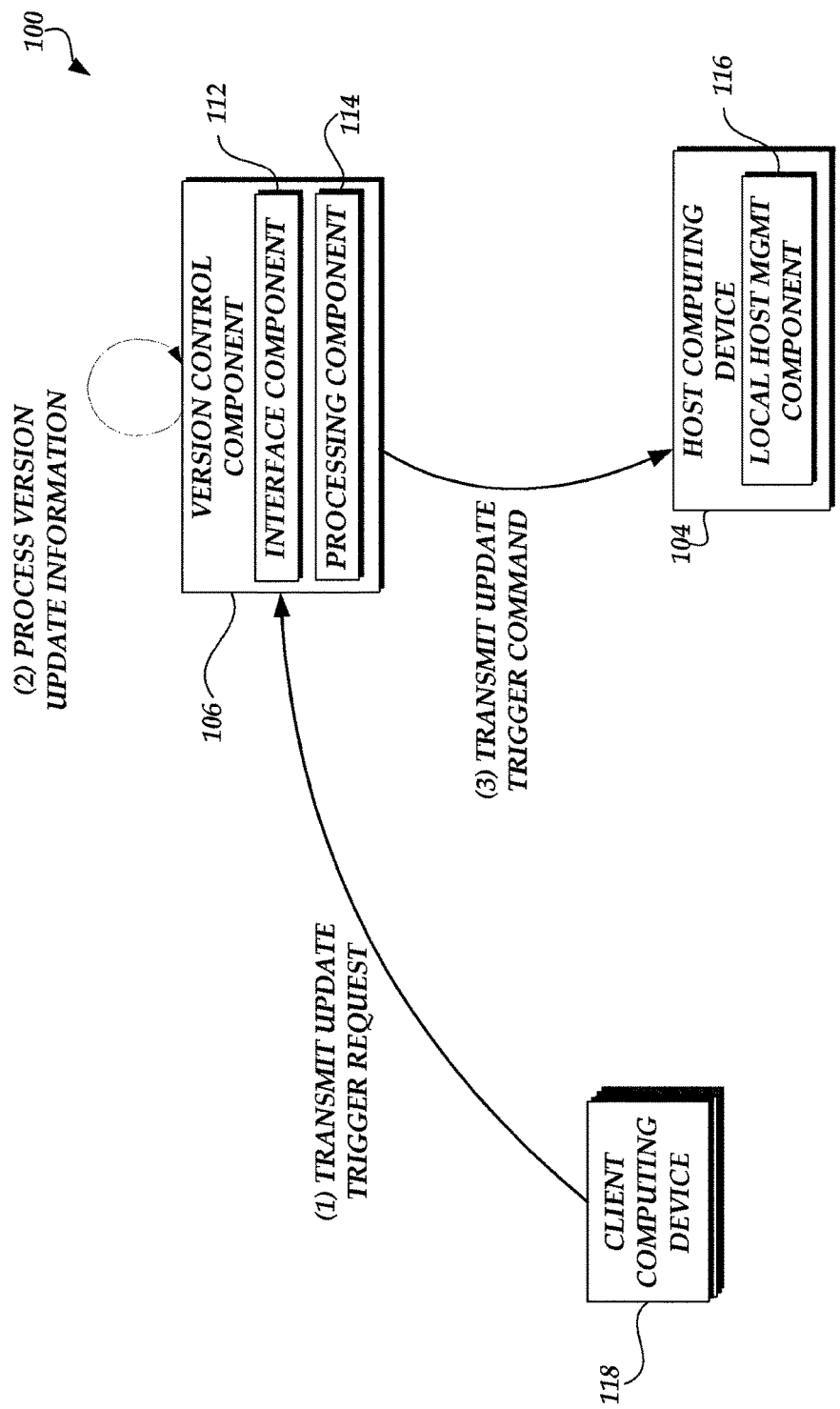
FIGS. 7A and 7B are simplified block diagrams of the virtual network of FIG. 1 illustrating the updating of host computing devices in response to a request by a client computing device.
Figure 7B:
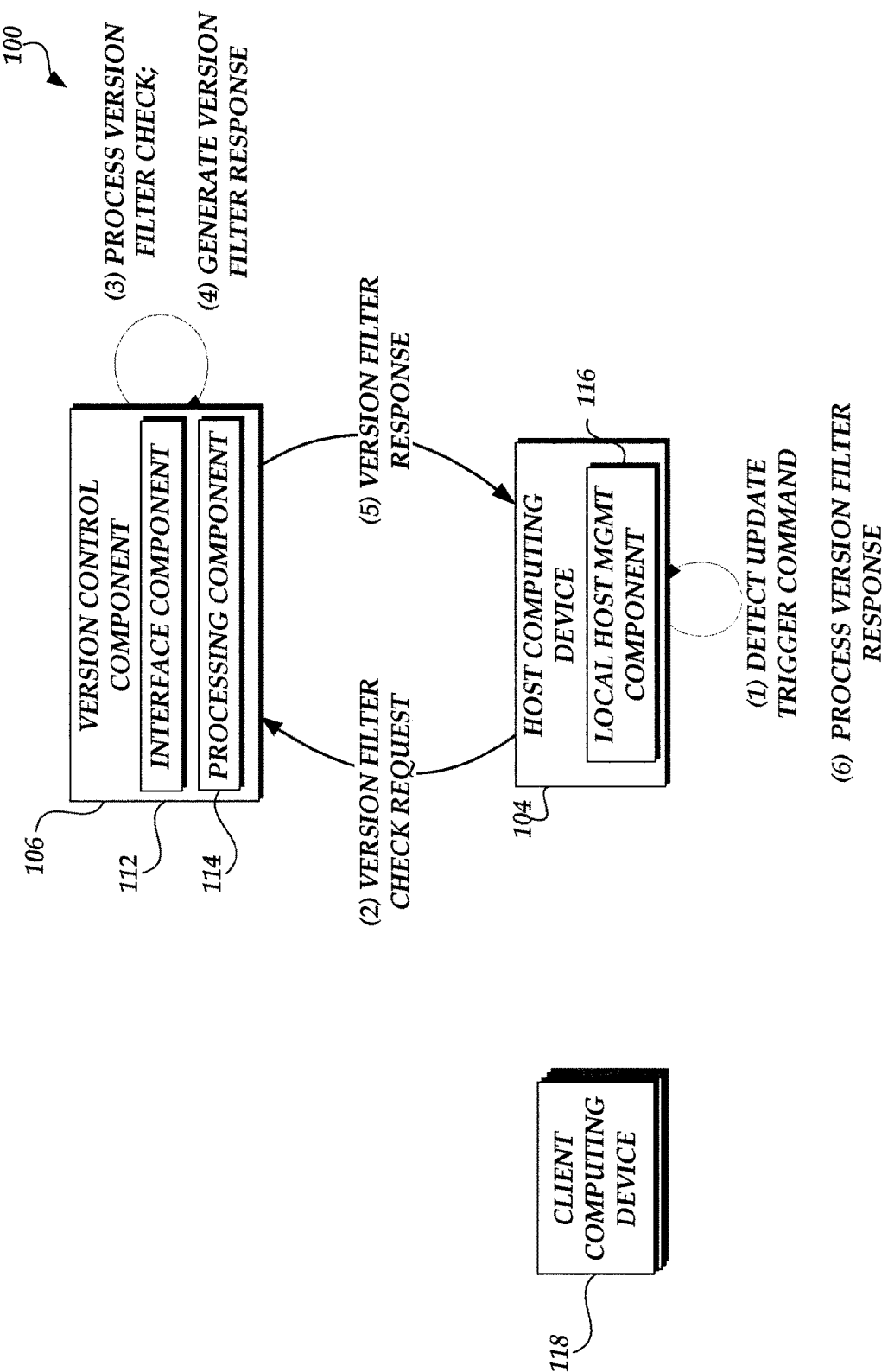

With reference now to FIGS. 7A and 7B, illustrative interactions between components of the virtual network environment 100, including a client computing device 118, a host computing device 104, and the version control component 106 will be described. Specifically, the interactions of FIGS. 7A and 7B depict one illustrative interaction for triggering an update to a host computing device 104 based at least in part on a request by a client computing device 118. The interactions of FIGS. 7A and 7B may be instigated, for example, in instances where a client computing device 118 wishes to immediately test or deploy an update to a specified host computing device 104 or set of host computing devices 104. Although FIGS. 7A and 7B will be described with regard to host computing devices 104, one skilled in the relevant art will appreciate that similar interaction may be implemented on computing devices 120 or combinations of host computing devices 104 and computing devices 120. Accordingly, the interactions illustrated in FIGS. 7A and 7B should not be construed as limiting.

With reference first to FIG. 7A, an interaction is depicted illustrating receipt of an update trigger from a client computing device 118, processing of that update trigger request by the version control component 106, and transmission of an update trigger command to a targeted host computing device 104. Specifically, at (1), a client computing device 118 may transmit an update trigger request to the version control component 106. Transmission of such an update trigger may be facilitated by any number of user interfaces. For example, in some embodiments, users of the virtual network environment 100 may be provided with a graphical user interface (e.g., via a dedicated application, web browser, etc.) for interacting with one or more host computing devices 104. Accordingly, transmission of an update trigger request may correspond to selection of an input within such interface. In other embodiments, transmission of an update trigger request may correspond to transmission of a specific command, such as by execution of a command within a textual or graphical interface. In still more embodiments, update trigger requests may be transmitted via an API.

In some embodiments, an update trigger request may be associated with a single host computing device 104. In other embodiments, an update trigger request may be associated with a collection of host computing devices 104. Illustratively, the individual or group of host computing devices 104 on which an update trigger is requested may be indicated within an update trigger request (e.g., by explicit indication, by selection of a request input selection associated with an individual or group of host computing devices 104, etc.). As a further example, in some embodiments, an update trigger request may include request criteria for selecting host computing devices 104 for which an update is requested. Such request criteria may correspond to any aspect or collection of aspects of targeted host computing devices 104, including but not limited to a target configuration, a target geographic location, a target performance aspect, and a target priority aspect.

In addition, an update trigger request may, in some embodiments, include version update information corresponding to a desired goal state of the targeted host computing devices 104. As described above, version update information may include any information designating a desired state of the host computing device 104, including installation, modification, configuration, or removal of data (e.g., files, software, firmware, etc.) on the host computing device 104. Illustratively, a client computing device 118 may specify, within the transmitted update trigger request, that a certain patch or software package should be implemented on the target host computing device 104. Accordingly, the version control component 106 may modify the goal state information corresponding to the target host computing device 104 in order to reflect the desired modification, as described above. In some embodiments, client computing devices 118 may be enabled to modify goal state information independent of transmission of an update trigger request (e.g., through additional or alternative user interfaces). In those embodiments, the version control component 106 may not be required to process version update information.

After reception of an update trigger request and processing of version update information, as necessary, the version control component 106 may transmit an update trigger command to the host computing device 104. Illustratively, the update trigger command may correspond to any command that causes the host computing device 104 to implement a version filter check request. In some embodiments, an update trigger command may correspond to a command to execute a process on the host computing device 104 (e.g., a version filter check request process). In other embodiments, an update trigger command may correspond to a command to modify data within the host computing device 104 in order to reflect that a version filter check is desired. For example, the update trigger command may create a trigger file within the host computing device 104 indicating that the host computing device 104 should request a version filter check. In such embodiments, the host computing device 104 may include a process or daemon that monitors for the existence of a trigger file (e.g., within a specified folder) and, upon detection of a trigger file, implements a version filter check request. By use of such a daemon, and by limiting the update trigger command to creation of a specific file on the host computing device 104, potential security issues may be reduced. For example, creation of a specific file within a given folder may be associated with a lower chance of exploitation than enabling the version control component 106 (or potentially other computing devices) to directly cause execution of a process on the host computing device 104. In still more embodiments, an update trigger command may correspond to a modification of other data monitored by the host computing device 104, such as storage of data on a networked storage device (not shown in FIG. 7A), or modification of a configuration of a networked computing device (not shown in FIG. 7A). For example, the host computing device 104 may be configured to monitor the status of a networked computing device (not shown in FIG. 7A) and to transmit a version filter check request on detection of a modification to the networked computing device.

In some embodiments, the update trigger command may be binary in nature, such that it is limited to implementation of a version filter check (e.g., by transmission of the command), or to not causing implementation of the version filter check. However, in other embodiments, the update trigger command may specify additional parameters relevant to the version filter check, such as desired timing of the version filter check. These parameters may be specified by the client computing device 118, by the version control component 106, or both. In some embodiments, in order to minimize security concerns, additional parameters may be required to be pre-screened (e.g., "whitelisted") in order to be recognized by the host computing device 104.

Transmission of an update trigger command may be facilitated by any number of known protocols, including but not limited to TCP, UDP, or ICMP transmission. In some embodiments, an update trigger command may be encrypted or obfuscated. For example, update trigger commands may be transmitted via secure shell (SSH) network protocol. In still more embodiments, update trigger commands may be transmitted by existing or newly created transmission standards, or interfaces, such as APIs. Various protocols for transmission between computing devices are well known within the art, and therefore will not be described in detail herein.

Though not shown in FIG. 7A, in some embodiments, the version control component 106 may be configured, in the event that a version filter check request is not received, to repeatedly transmit an update trigger command. For example, after transmitting an update trigger command, the version control component 106 may wait a predetermined amount of time to receive a version filter check request in response. If no response is received, an update trigger command may be retransmitted. In some embodiments, retransmission may be repeated until a version filter check request is received in response. In other embodiments, the version control component 106 may be configured to report an error after a number of unsuccessful update trigger command transmissions (e.g., update trigger command transmissions not resulting in a received version filter check request).

Turning now to FIG. 7B, one example of an interaction between the host computing device 104 and the version control component 106, such as an interaction taken in response to receiving an update trigger command, will be described. Illustratively, the interaction of FIG. 7B may occur immediately or substantially immediately after an interaction as described in FIG. 7A. Specifically, at (1), the host computing device 104 may determine that an update trigger command has been received. In some embodiments, detection of an update trigger command may include direct reception of the command (e.g., via an SSH transmission). In other embodiments, detection of an update trigger command may include indirect reception, such as by detecting the existence of a update trigger command file within a specified location of the host computing device 104 (e.g., a "watched" folder). Based on the detection of an update trigger command, the local computing device management component 116 may then transmit the version filter check to the version control component 106 at (2).

Thereafter, at (3), the version control component 106 may obtain and process the version filter request. For example, the version control component 106 can obtain version information that is included in the version filter check transmitted by the local computing device management component 116. Alternatively, the version control component 106 can transmit requests to the local computing device management component 116 for specific information or additional information as necessary. Illustratively, the version control component 106 makes a comparison of the current version information associated with the requesting host computing device 104 to determine whether the host computing device is associated with desired version goal state, as defined in the version filter information. In instances where a version filter check is transmitted in response to detection of an update trigger command, it may be very likely that the current version information associated with the requesting host computing device 104 does not match the desired goal state (e.g., in instances where an update trigger command is transmitted in order to implement an update). However, in some instances, it may be possible for a host computing device 104 to receive an update trigger command even where no update is necessary. For example, a client computing device 118 may transmit an update trigger command to a specific set of host computing device 104 in order to ensure that all host computing devices 104 of the set include a specific software patch. In this instance, those host computing devices 104 within the set that already include the specific software patch may already conform to the desired goal state.

Based on the comparison, the version control component 106 can then generate a version filter response (4). In one embodiment, the version control component 106 can generate a notification that an update is required (e.g., where the host computing device 104 does not match the goal state corresponding to the host computing device 104). Additionally, the version control component 106 can provide update information utilized by the requesting host computing device 104 to cause an update, modification, or reconfiguration of the host computing device 104. In other embodiments, the version control component 106 can transmit a notification that no update is necessary (e.g., where the host computing device 104 already conforms to the goal state of the host computing device 104). In still more embodiments, the version control component 106 may be configured not to transmit any notification if the version filter check passes. In yet more embodiments, the version control component 106 can generate information that will be used by the local computing device management component 116 to transmit subsequent version filter check requests. Thereafter, the resulting generated by the version control component 106 (if any) may be transmitted to the requesting host computing device 104 (5) and processed (6). Processing of the version filter response may include, for example, implementing the update, modification, or reconfiguration specified within the received version filter response.

Though the illustrative interactions of FIGS. 7A and 7B are described with reference to a single version control component 106, in some embodiments, multiple version control components 106 may be utilized. For example, the interactions of FIG. 7A may include a first version control component 106, while the interactions of FIG. 7B may include a second version control component 106. In still more embodiments, the functionality described herein with reference to the version control component may be divided among two or more devices. For example, a first device (not shown in FIGS. 7A and 7B) may be configured to transmit an update trigger command to a host computing device 104, while a second distinct device may be configured to receive a version filter check request from the host computing device 104. Accordingly, while the interactions of FIGS. 7A and 7B are described with respect to a single version control device 106, these interactions should not be seen as limiting.

Figure 8:
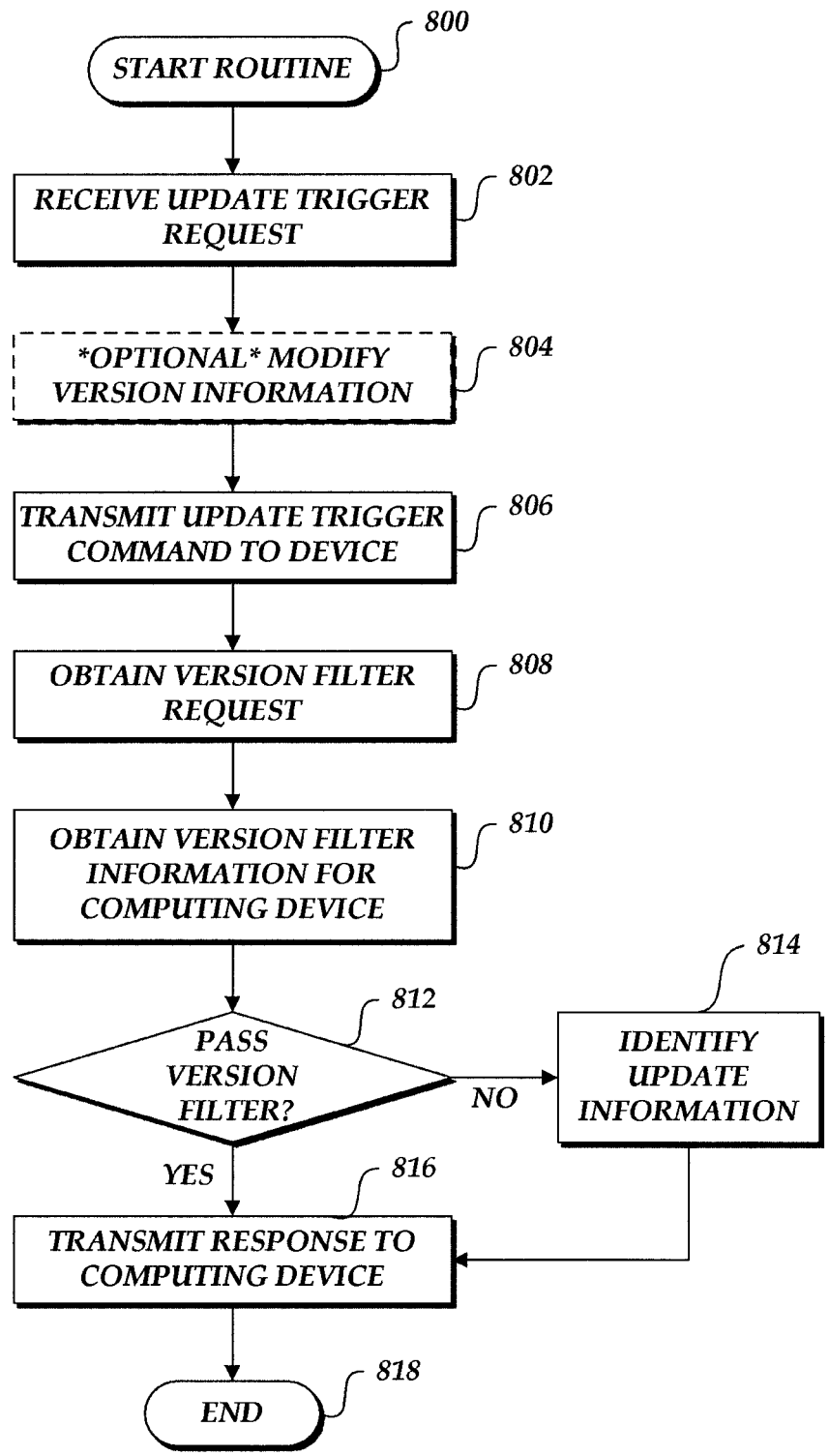
FIG. 8 is a flow diagram illustrating the reception of an update trigger request, such as from a client computing device of FIG. 1, and processing of the update trigger request.

Turning now to FIG. 8, a routine 800 for receiving and responding to an update trigger request (e.g., from a client computing device 118) will be described. The routine 800 may be carried out, for example, by a version control component 106. Illustratively, the routine 800 may represent a modification to the routine 500 described above with respect to FIG. 5 in order facilitate update trigger requests. Accordingly, at block 802, an update trigger request may be received with respect to a target computing device or set of target computing devices, such as one or more host computing device 104. Illustratively, the update trigger request may be received from a client computing device 118. As described above, an update trigger request may be received, by way of non-limiting example, via a graphical user interface (e.g., a web browser or application), via API call, or via other user interfaces (e.g., as an SSH command or the like).

As previously noted, in some embodiments, an update trigger request may include a request to modify version information associated with the target computing device. Illustratively, an update trigger request may be transmitted in order to facilitate implementation of a specific update on the target computing device, and as such, may include an indication of the specific update desired. Accordingly, if version information associated with an update or modification to the target computing device is included within the received update trigger request, the version control component 106 may, at block 804, modify the version information associated with the target computing device. In this manner, the desired update or modification may be implemented on target computing device, as will be described below. In other embodiments, client computing devices 118 (or other computing devices) may be enabled to modify version information independent of update trigger requests (e.g., via independent or otherwise unrelated interfaces, APIs, etc.). Accordingly, in such embodiments, block 804 may be omitted.

Thereafter, at block 806, the version control component 106 may transmit an update trigger command to the targeted computing device or set of computing devices (e.g., one or more host computing devices 104). As described above, the update trigger command may correspond to any command that causes the host computing device 104 to implement a version filter check request, including but not limited to a command to execute a process on the host computing device 104 or creation of a trigger file within the target computing device.

After transmission of an update trigger command, at block 808, the version control component 106 may obtain a version filter request, which may alternatively be referred to as a version verification request (e.g., transmitted by the target computing device in response to reception of the update trigger command). In one example, the version filter request is transmitted by the local computing device management component 116 of the target computing device. As previously described, the local computing device management component 116 can independently transmit the version filter request in accordance with criteria evaluated by the local computing device management component 116 or other information provided by the version control component 106. The version filter request can include a variety of information that will be utilized by the version control component 106 in processing the request. For example, the version filter request can include information identifying operating system and software applications that are executing on the requesting host computing device 104. In another example, the version filter request can include information identifying the last version, or equivalent version, of the operating system and software applications executing on the host computing device 104. In still further examples, the version filter request can include information that is different from previous information provided by the local computing device management component 116.

Though not shown in FIG. 8, in some embodiments, the version control component 106 may be configured to determine that an expected version filter request has not been received by a target computing device. For example, the version control component 106 may be configured to begin a timer after transmission of an update trigger command (e.g., at block 806). If, after a threshold period of time has elapsed, a version filter request has not been received from the target computing device, the version control component 106 may be configured to retransmit the update trigger command (e.g., by returning to block 806). Such retransmission may be beneficial, for example, in instances where either the update trigger command or the version filter request are not guaranteed to successfully be received or recognized (e.g., due to hardware or software error, network congestion, etc.). In some instances, the version control component 106 may be configured to continuously retransmit version trigger commands until a version filter request is received. Thereafter, the routine 800 may proceed at block 810, as described below. In other instances, the version control component 106 may be configured to report an error after a threshold number of version trigger commands have been transmitted. In these instances, the routine 810 may end, or be delayed until a version filter request is received.

Moreover, in some embodiments, the routine 800 may be implemented on multiple devices, such as multiple version control components 106. Illustratively, in some embodiments, a first version control components 106 may be configured to execute blocks 802 through 806 of the routine 800, while a second version control components 106 may be configured to execute blocks 808 through 816. One skilled in the art will appreciate that the routine 800 may be implemented by or divided across any number of devices.

At block 810, the version control component 106 obtains version filter information that specifies the desired version goal state of the target computing device (e.g., as optionally modified by block 804). In some embodiments, the version control component 106 can obtain the version filter information in whole or in part from the computing device version filter data store 110, from local memory (e.g., cache memory), from a received update trigger request, or from any combination thereof. At decision block 812, a test is conducted to determine whether version filter information corresponds to the version information identified in the version request (directly or indirectly). As noted above, in instances where a version filter check is transmitted in response to detection of an update trigger command, it may be very likely that the current version information associated with the target computing device does not match the desired goal state (e.g., in instances where an update trigger command is transmitted in order to implement an update). However, in some instances, it may be possible for a host computing device 104 to receive an update trigger command even where no update is necessary. For example, in instances where a large set of computing devices is targeted in order to maintain a uniformity of configuration, a sub-set of targeted computing devices may already conform to the desired configuration, and as such, the version information identified in the version request may already correspond to the determined version filter information.

If the version filter information does not match with the version information, it can be assumed that the computing device, such as a host computing device 104, may have one or more updates that should be implemented. Accordingly, at block 814, the version control component 106 may identify update information. In one embodiment, the version control component 106 can generate a notification that an update is required and identify one or more potential sources of the update. In another embodiment, the version control component 106 can generate the notification and provide the update information required (e.g., code to modify the operating system or software application code).

If the version filter information matches the version information (e.g., if no update is required), or alternatively, after the notifications and updates are generated at block 814, the version control component 106 may, at block 816, transmit a response to the requesting local computing device management component 116 (e.g., on a target computing device). As will be discussed below, the response may then be processed (as necessary) by the target computing device, resulting in implementation of any updates necessary in order to reach a desired version goal state. As previously discussed, however, if no update is required, the version control component 106 can omit the transmission of any information to the local computing device management component 116. Thereafter, at block 818, the routine 800 may terminate.

Figure 9:
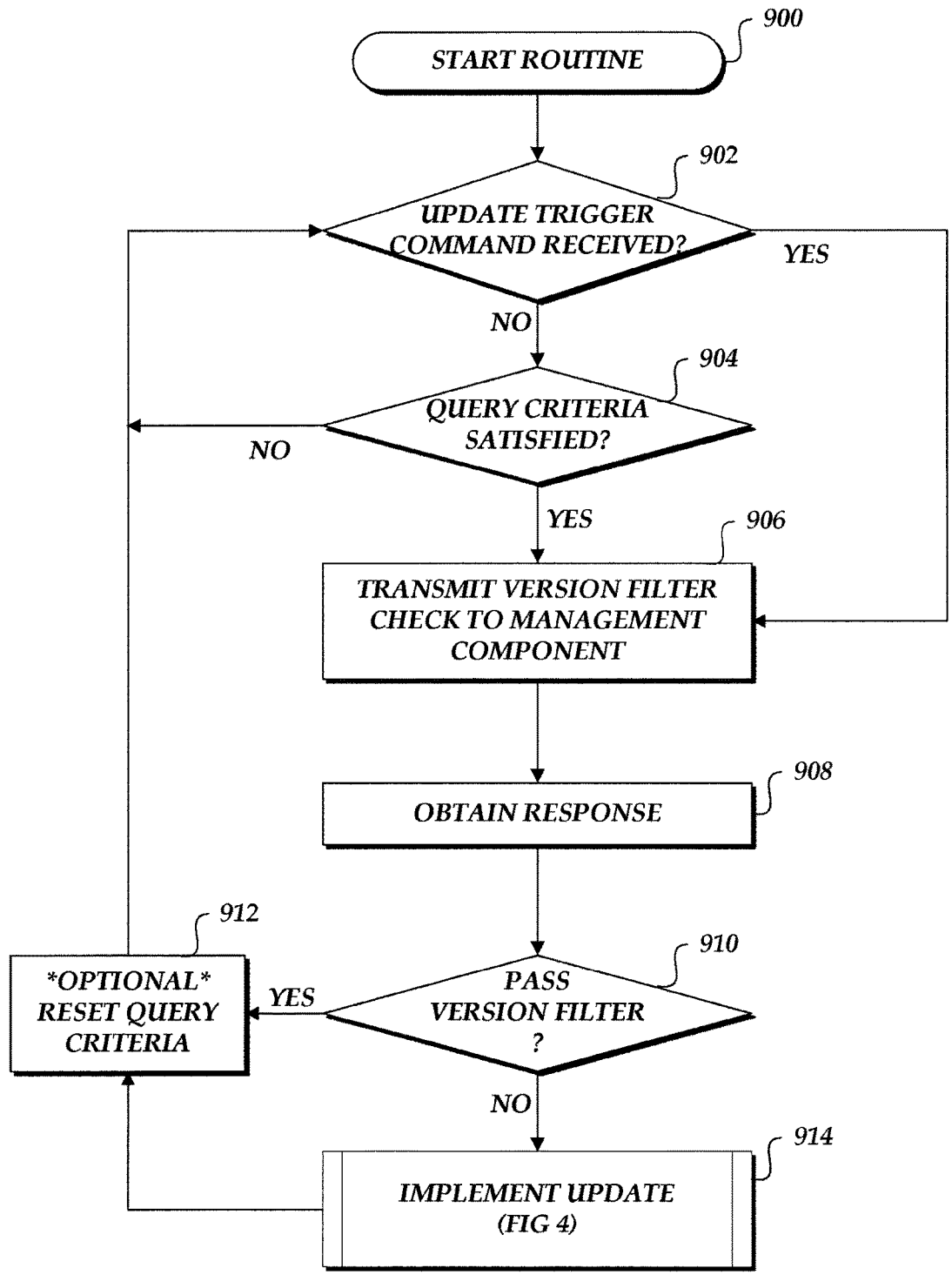
FIG. 9 is a flow diagram illustrating an update routine facilitating reception of update trigger commands.

Turning now to FIG. 9, a routine 900 for responding to update trigger commands, as well as for generating version filter requests will be described. Illustratively, the routine 900 may represent a modification to the routine 300 described above with respect to FIG. 3 in order facilitate reception of update trigger commands. The routine 900 may be implemented, for example, by a local computing device management component 116 on a host computing device 104 of FIG. 1. Although the routine 900 will be described with regard to the local computing device management component 116, one skilled in the relevant art will appreciate that one or more portions of routine 900 may be implemented by other components of the host computing device 104.

Specifically, at block 902, a test may be made as to whether an update trigger command has been received at the host computing device 104. As described above, in some embodiments, update trigger commands may be transmitted by creation of a trigger file on the host computing device 104. Still further, in some embodiments, update trigger commands may be transmitted by creation of a trigger file on another data storage device, such as network storage accessible to the host computing device 104. In these embodiments, block 902 may include determining whether a trigger files exists within the host computing device 104 or such data storage. In other embodiments, block 902 may include determination of whether an update trigger command has been received through other mechanisms, such as inspection of log files, direct reception of an update trigger command (e.g., through SSH or the like), etc. In instances where an update trigger command has been received, the routine 900 may continue to initiate transmission of a version filter check at block 906, as will be described below.

In instances where an update trigger command is not received, the routine 900 may proceed to block 904, where a test may be conducted to determine whether query criteria for determining whether to submit a version filter check has been satisfied. Illustratively, query criteria may correspond to any set of criteria used to determine when or how often to submit version filter check to a management component, such as the version control component 106. In some embodiments, query criteria may correspond to a period of time that has passed since the last version filter check, such that version filter checks are submitted at each interval of a given period. In other embodiments, query criteria may include additional or alternative requirements, such as a required network status (e.g., available bandwidth), required host computing device status 104 (e.g., available processing capability, memory, electrical power, etc.), error conditions, performance thresholds (maximum and minimum), or time-of-day requirements (e.g., to avoid times of frequent use). In some embodiments, query criteria may be based at least in part on service level agreements (SLAs) associated with the host computing device 104, virtual machines implemented by the host computing device 104, or other computing devices dependent on the host computing device 104 or machines implemented by the host computing device 104.

In the instance that query criteria are not yet satisfied, the routine 900 may return to block 902, described above, until such time that either an update trigger command is received, or query criteria is satisfied. Thereafter, the routine may continue at block 906.

Specifically, at block 906, the host computing device 104 may transmit a version filter check request to the version control component 106. As described above, in some instances, content of the version filter check request may be based, at least in part, on a received update trigger command. For example, the update trigger command may include one or more parameters to be included within or to modify the content of the version filter check. In other embodiments, the version filter check (or the content thereof) may be fixed and independent of the update trigger command. Illustratively, by maintaining version filter check as fixed and independent of the update trigger command, security implications of the update trigger command may be reduced or minimized. For example, because functionality of the update trigger command may be limited to execution of an already defined action (e.g., transmission of a version filter check), it may be unlikely that the update trigger command functionality would be exploited. In still more embodiments, parameters included within the update trigger command may be required to be pre-approved (e.g., "whitelisted"). In these embodiments, functionality of the update trigger command may be expanded relative to update trigger commands including no parameters, while maintaining a relatively high level of security in comparison to update trigger commands with unverified parameters.

Thereafter, at block 908, the host computing device 104 may obtain a response from the version control component 106. In an illustrative embodiment, the host computing device 104 can obtain information that identifies whether the version filter check resulted in a determination that host computing device 104 satisfies or does not satisfy the desired version goal state. Additionally, the resulting information can also include information identifying any updates that should be implemented by the host computing device 104 or, in some instances, the required update information itself.

After reception of a response from the version control component 106, the routine may proceed to decision block 910, where a test may be conducted to determine whether the version filter check indicates that the host computing device 104 satisfies the version filter check (e.g., passes the version filter check). If, at decision block 910, the host computing device 104 does pass the version filter check information, the routine 900 may continue at block 912, as will be described below. Alternatively, if at decision block 910 the host computing device 104 does not pass the version filter check information, at block 914, the local computing device management component 116 can implement any required updates or modifications based on information provided by the version control component 106. An illustrative subroutine for implementing updates based on type information for host computing devices 104 is described above with respect to FIG. 4. However, one skilled in the relevant art will appreciate that the implementation of updates on host computing devices 104 or on computing devices 120 may incorporate additional or alternative criteria.

After implementation of any necessary updates, or after a determination that the host computing device 104 does pass the version filter check information, the routine 900 may proceed to block 912. Specifically, at block 912, the local computing device management component 116 may optionally reset query criteria used to determine whether to transmit a version filter check. In some embodiments, resetting of query criteria may be dependent, at least in part, on the impetuous for transmission of the prior version filter check. For example, if the prior version filter check was transmitted based on previous satisfaction of the query criteria at block 904 (e.g., by expiration of a version filter check timer) the query criteria may be reset at 912. Alternatively, if prior version filter check was transmitted based on a received update trigger command, it may be undesirable to reset the query criteria. For example, an operator of the virtual network environment 102 may have selected the query criteria such that each host computing device 104 transmits a version filter check at a specific interval. In some such embodiments, resetting query criteria in response to an update trigger command may disrupt the intended schedule of version filter checks. In other embodiments; it may be desirable to minimize version query checks where possible, and as such, the query criteria may be reset regardless of the cause of the previous transmitted version filter check. After resetting the query criteria, as necessary, the routine 900 may then returns to block 902, as described above. The routine 900 may continue as necessary in order to facilitate reception of update trigger commands and implementation of any necessary updates.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is to be understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method for managing a host computing device, wherein the host computing device hosts one or more virtual machine instances, the method comprising:

under control of one or more processors configured with specific executable instructions, obtaining, at a version control component, desired version information for a set of host computing devices, wherein the desired version information corresponds to a desired configuration of each of the set of host computing devices;

during each interval in a set of intervals:

receiving a version verification request at the version control component from a host computing device of the set of host computing devices, wherein the version verification request includes version information associated with a current configuration of the host computing device, and wherein the version verification request is received in accordance with a time distribution of version verification requests across the set of computing devices;

determining, at the version control component, whether the version information included in the request corresponds to the desired version information for the host computing device;

transmitting information responsive to the determination to the host computing device from the version control component;

receiving, at the version control component, a version verification trigger request from a client computing device, wherein the version verification trigger request corresponds to a request to initiate a version verification on the host computing device responsive to a modification of the desired version information of the host computing device;

in response to a modification of the desired version information of the host computing device, transmitting a version trigger command from the version control component to the host computing device to cause the host computing device to transmit a version verification request, wherein the version trigger command does not include the desired version information;

receiving, at the version control component, a second version verification request from the host computing device; and transmitting second information responsive to the host computing device from the version control component.

2. The computer-implemented method of claim 1, wherein the desired version information corresponds to a plurality of host computing devices.

3. The computer-implemented method of claim 1, wherein transmitting information responsive to the determination includes transmitting an identification of an update to be implemented by the host computing device.

4. The computer-implemented method of claim 1, wherein the version trigger command does not include an identification of a device to which to transmit a version verification request.

5. A system for managing computing devices, the system comprising:

at least one data store configured to store desired version information for a target computing device, wherein the desired version information corresponds to a desired configuration of the target computing device, and wherein the target computing device corresponds to a host computing device hosting one or more virtual machine instances; and one or more processors in communication with the at least one data store, the one or more processors configured to:

receive a request to trigger a version verification on the target computing device;

transmit a version trigger to the target computing device to cause the target computing device to transmit a version verification request, wherein the version trigger corresponds to a trigger file, wherein the target computing device is configured to periodically monitor for the existence of the trigger file and transmit a version verification request in response to detecting the trigger file, and wherein the version trigger identifies a timing, based on a time distribution of configuration requests, for transmitting a version verification request;

receive a version verification request in accordance with the time distribution, responsive to received version trigger information, to check for a configuration update for the target computing device, the version verification request including version information associated with a current configuration of the target computing device;

determine whether the version information included in the request corresponds to the desired version information in the at least one data store; and transmit information responsive to the determination to the target computing device.

6. The system of claim 5, wherein the one or more processors are further configured to:

determine that a version verification request has not yet been received; and in response to said determination, transmit a second version trigger to the target computing device to cause the target computing device to transmit a version verification request.

7. The system of claim 5, wherein the version trigger does not include the desired version information.

8. The system of claim 5, wherein the one or more processors are configured to transmit the version trigger to the target computing device via at least one of a secure shell connection or an application programming interface call.

9. The system of claim 5, wherein the target computing device is configured to periodically transmit version verification requests.

10. The system of claim 9, wherein the target computing device is further configured to modify a period for transmission of version verification based at least in part on reception of the version trigger.

11. A computer-implemented method for managing computing devices, the method comprising:

under control of one or more processors configured with specific executable instructions, receiving a request to trigger a version verification on a target computing device that hosts one or more virtual machine instances;

transmitting a trigger file to the target computing device to cause the target computing device to transmit a version verification request, wherein the target computing device is configured to transmit a version verification request in response to detecting the trigger file, and wherein the trigger file identifies a timing, based on a time distribution of configuration requests, for transmitting a version verification request;

receiving a version verification request responsive to received version trigger information in accordance with the time distribution, to check for a configuration update for the target computing device, the version verification request including version information associated with a current configuration of the target computing device;

determining whether the version information included in the request corresponds to a desired configuration of the target computing device; and transmitting information responsive to the determination to the requesting target computing device.

12. The computer-implemented method of claim 11, wherein transmitting information responsive to the determination includes transmitting an identification of an update to be implemented by the target computing device.

13. The computer-implemented method of claim 12, wherein the update corresponds to at least one of software data, patch data, configuration data, or an action to be taken by the target computing device.

14. The computer-implemented method of claim 11, wherein transmitting information responsive to the determination includes transmitting an indication that the current configuration of the target computing device corresponds to the desired configuration of the target computing device.

15. The computer-implemented method of claim 11, wherein the desired configuration is determined based at least in part on the current configuration of the target computing device.

16. The computer-implemented method of claim 11, wherein the target computing device is configured to periodically transmit version verification requests.

17. The computer-implemented method of claim 11, wherein the target computing device corresponds to a network computing device.

18. A non-transitory computer-readable storage medium having computer-executable instructions for managing computing devices, wherein the computer-executable instructions, when executed by one or more computing devices, cause the one or more computing devices to:
  receive a request to trigger a version verification on a target computing device that hosts one or more virtual machine instances;
  transmit a trigger file to the target computing device, wherein the target computing device is configured to transmit a version verification request in response to detecting the trigger file, and wherein the trigger file identifies a timing, based on a time distribution of configuration requests, for transmitting a version verification request;
  receive a version verification request responsive to received version trigger information in accordance with the time distribution, to check for a configuration update for the target computing device, the version verification request including version information associated with a current configuration of the target computing device, wherein the version verification request is transmitted from the target computing device;
  determine whether the version information included in the request corresponds to a desired configuration of the target computing device; and
  transmit information responsive to the determination to the target computing device.

19. The non-transitory computer-readable storage medium of claim 18, wherein the information responsive to the determination comprises an identifier of an update to be implemented by the target computing device.

20. The non-transitory computer-readable storage medium of claim 18, wherein the target computing device is configured to periodically monitor for the existence of the trigger file.

21. The non-transitory computer-readable storage medium of claim 18, wherein the target computing device is configured to periodically transmit version verification requests.

\* \* \* \* \*